US008299868B2

(12) United States Patent
Kato et al.

(10) Patent No.: US 8,299,868 B2
(45) Date of Patent: Oct. 30, 2012

(54) HIGH FREQUENCY COUPLER AND COMMUNICATION DEVICE

(75) Inventors: Yoshihiro Kato, Kanagawa (JP); Kenzoh Nishikawa, Kanagawa (JP); Takanori Washiro, Kanagawa (JP); Satoshi Konya, Kanagawa (JP)

(73) Assignee: Sony Corporation, Tokyo (JP)

( * ) Notice: Subject to any disclaimer, the term of this patent is extended or adjusted under 35 U.S.C. 154(b) by 299 days.

(21) Appl. No.: 12/787,669

(22) Filed: May 26, 2010

(65) Prior Publication Data

US 2011/0006864 A1 Jan. 13, 2011

(30) Foreign Application Priority Data

Jul. 13, 2009 (JP) ................................ 2009-164331

(51) Int. Cl.
*H01P 5/02* (2006.01)
*H04B 5/00* (2006.01)

(52) U.S. Cl. .................................... 333/24 R; 455/41.1

(58) Field of Classification Search ................ 333/24 R, 333/32, 24 C; 455/41.1
See application file for complete search history.

(56) References Cited

U.S. PATENT DOCUMENTS

| | | | | | |
|---|---|---|---|---|---|
| 5,105,201 | A * | 4/1992 | Nakase et al. | ................ | 343/715 |
| 5,557,290 | A * | 9/1996 | Watanabe | ...................... | 343/713 |
| 6,317,011 | B1 * | 11/2001 | Barnett et al. | .............. | 333/24 C |
| 7,894,770 | B2 * | 2/2011 | Washiro | ........................ | 455/41.1 |
| 2008/0076351 | A1 | 3/2008 | Washiro | | |
| 2008/0119135 | A1 | 5/2008 | Washiro | | |
| 2010/0248625 | A1 * | 9/2010 | Washiro | ........................ | 455/41.1 |

FOREIGN PATENT DOCUMENTS

| | | |
|---|---|---|
| JP | 2008-99236 | 4/2008 |
| JP | 2008-131372 | 6/2008 |

OTHER PUBLICATIONS

U.S. Appl. No. 12/778,452, filed May 12, 2010, Washiro.

* cited by examiner

*Primary Examiner* — Dean O Takaoka

(74) *Attorney, Agent, or Firm* — Oblon, Spivak, McClelland, Maier & Neustadt, L.L.P.

(57) ABSTRACT

A high frequency coupler includes a ground, a first coupling electrode connected via a first resonator unit to an input and output terminal of a communication circuit, and one or more second coupling electrodes connected via a second resonator unit designed utilizing a ground to a ground terminal of the communication circuit.

7 Claims, 22 Drawing Sheets

HIGH FREQUENCY COUPLER AND COMMUNICATION DEVICE

BACKGROUND OF THE INVENTION

1. Field of the Invention

The present invention relates to a high frequency coupler and a communication device for a communication machine that carries out bulk data transmission in a proximity distance by a weak UWB communication system using a wide bandwidth of a high frequency, and particularly to a high frequency coupler and a communication device having two or more communication spots at low cost and small space.

2. Description of the Related Art

Non-contact communication has been widely utilized as media for authentication information, electronic money, and other value information. Recently, as further applications of such non-contact communication, applications to bulk data transmission, such as downloading or streaming of video images, music, and the like, are examined.

Proximity wireless transfer techniques applicable to high speed communication may include "TransferJet®" using weak UWB (ultra wide band) signal (for example, refer to Japanese Unexamined Patent Application Publication No. 2008-99236 and www.transferjet.org/en/index.html (as of Jun. 23, 2009)). Such a proximity wireless transfer technique (TransferJet) is basically a system of signal transmission utilizing the coupling action of induction electric fields, and a communication device thereof is configured with a communication circuit unit processing a high frequency signal, a coupling electrode disposed separately at a certain height from a ground, and a resonator unit efficiently supplying the high frequency signal to the coupling electrode. A component including a coupling electrode or a coupling electrode and a resonator unit may also be called as a "high frequency coupler" herein.

Similar to NFC (near field communication) communications and the like from the past (NFC is standardized as ISO/IEC IS 18092), proximity wireless transfer systems can also be configured as a pair of a reader writer (initiator) sending a request command and a transponder (target) returning a response command.

Here, such a proximity wireless transfer system does not have to get a wireless station license by using weak wireless, and the communication distance is approximately 3 cm equivalent to a half wavelength of a used frequency band. Therefore, when carrying out proximity wireless transfer between two instruments respectively having a high frequency coupler mounted thereto, it is desirable to dispose coupling electrodes of each other coming close sufficiently.

One of typical utilization forms of proximity wireless transfer systems may include, as illustrated in FIG. 23, reading and writing information for a mobile instrument by placing a host instrument, such as a digital camera with a high frequency coupler built therein, on a reading surface of a reader writer, such as a personal computer or a cradle. However, since there is no industry standard on the shape of a housing and the installation site of a high frequency coupler in an instrument, an event is also considered that, depending on the combination of instruments, an installation method capable of proximity wireless transfer is not found in the utilization form of the illustration, that is, to become incapable of communication.

When there is only one communication spot in a high frequency coupler, it is prone to be in an event incapable of communication. For example, in order to facilitate acquisition of an optimal communication situation between the coupling electrodes of both, the configuration is proposed in which a plurality of high frequency couplers is disposed in an array (for example, refer to Japanese Unexamined Patent Application Publication No. 2008-131372). However, it is difficult to find a housing space for a plurality of high frequency couplers in an instrument in design, and the costs turns out to increase in accordance with the item number of high frequency couplers to be used.

SUMMARY OF THE INVENTION

It is desirable to provide a high frequency coupler and a communication device of excellent quality for a communication machine carrying out bulk data transmission in a proximity distance by a weak UWB communication system using a wide bandwidth of a high frequency.

It is further desirable to provide a high frequency coupler and a communication device of excellent quality having two or more communication spots at low cost and small space.

According to an embodiment of the present invention, there is provided a high frequency coupler, including: a ground; a first coupling electrode connected via a first resonator unit to an input and output terminal of a communication circuit; and one or more second coupling electrodes connected via a second resonator unit designed utilizing a ground to a ground terminal of the communication circuit.

According to another embodiment of the present invention, there is provided the high frequency coupler according to the embodiment described firstly is configured in such a manner that, in a certain phase state of a high frequency signal flowing in the input and output terminal, charges with a sign different from that of charges concentrated in the first coupling electrode are concentrated in the second coupling electrode.

According to still another embodiment of the present invention, there is provided the high frequency coupler according to the embodiment described firstly, in which a ground for the first resonator unit is designed as the second resonator unit, and the second coupling electrode is placed at a site approximately symmetrical to the first coupling electrode.

According to yet another embodiment of the present invention, there is provided the high frequency coupler according to the embodiment described firstly, in which the second coupling electrode is configured based on a shape of a ground plane.

According to yet another embodiment of the present invention, there is provided the high frequency coupler according to the embodiment described firstly, in which at least one of the first and second coupling electrodes is configured based on a conductor pattern implemented on a printed board.

According to yet another embodiment of the present invention, there is provided the high frequency coupler according to the embodiment described firstly, in which the second coupling electrode is configured using a chassis or a metal housing of a mobile instrument with the high frequency coupler built therein.

In addition, according to yet another embodiment of the present invention, there is provided a communication device, including: a communication circuit processing a communication signal; a ground; a first coupling electrode connected via a first resonator unit to an input and output terminal of the communication circuit; and one or more second coupling electrodes connected via a second resonator unit designed utilizing a ground to a ground terminal of the communication circuit. The communication circuit processes the communication signal in accordance with a terminal voltage between the input and output terminal and the ground terminal.

According to embodiments of the present invention, it is possible to provide a high frequency coupler and a communication device of excellent quality having communication spots capable of electric field coupling in a plurality of directions at low cost and small space.

According to the embodiments of the present invention described firstly and lastly above, the first and second coupling electrodes have communication spots of electric field coupling in directions different from each other, and thereby the high frequency coupler can have a plurality of communication spots as a whole.

According to the embodiment of the present invention described secondly above, the first and second coupling electrodes have communication spots in directions different from each other due to electric fields formed by charges in orientations opposite to each other, and thereby the high frequency coupler can have a plurality of communication spots as a whole.

According to the embodiment of the present invention described thirdly above, the ground for the first resonator unit is designed as the second resonator unit, and is connected to the second coupling electrode via the second resonator unit. Then, the second coupling electrode is placed at a site symmetrical to the first coupling electrode, and the first and second coupling electrodes have communication spots of electric field coupling in directions different from each other, so that the high frequency coupler can have a plurality of communication spots as a whole.

According to the embodiment of the present invention described fourthly above, the second coupling electrode can be configured based on the shape of the ground plane.

According to the embodiment of the present invention described fifthly above, at least one of the first and second coupling electrodes can be configured based on the conductor pattern implemented on the printed board.

According to the embodiment of the present invention described sixthly above, the second coupling electrode can be configured using a chassis or a metal housing of a mobile instrument with the high frequency coupler built therein.

Further applications, characteristics, and advantages of the embodiments of the present invention will be apparent from embodiments of the present invention and more detailed descriptions based on attached drawings described later.

DESCRIPTION OF THE PREFERRED EMBODIMENTS

A detailed description is given below to embodiments of the present invention with reference to the drawings.

Firstly, the operation principle of proximity wireless transfer by a weak UWB communication system is described.

Figure 1:
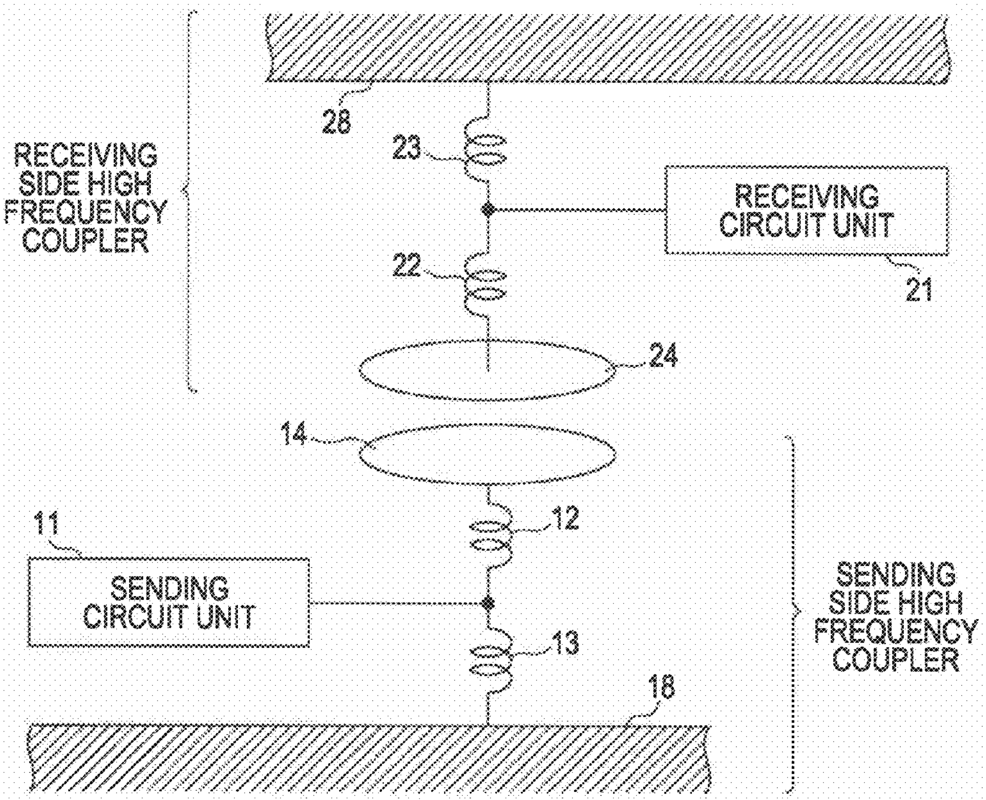
FIG. 1 schematically illustrates the configuration of a proximity wireless transfer system by a weak UWB communication system utilizing an electric field coupling action.

FIG. 1 schematically illustrates the configuration of a proximity wireless transfer system by a weak UWB communication system utilizing an electric field coupling action. In FIG. 1, coupling electrodes 14 and 24 that a transmitter 10 and a receiver 20 respectively have and are used for transmission and reception are disposed to be facing separately by, for example, approximately 3 cm (or approximately a half wavelength of a used frequency band) and are capable of electric field coupling. When a sending request is generated from an upper level application, a sending circuit unit 11 on the transmitter side generates a high frequency sending signal, such as a UWB signal, based on sending data propagates as an electric field signal from a sending electrode 14 to a receiving electrode 24. Then, a receiving circuit unit 21 on the receiver 20 side processes the received high frequency electric field signal for demodulation and decode to pass the reproduced data to an upper level application.

By using UWB in such proximity wireless transfer, ultrahigh speed data transmission at approximately 100 Mbps can be provided. In addition, such proximity wireless transfer utilizes the coupling action of, not radiation electric fields, but electrostatic fields or inductive electric fields as described later, and electric field intensity thereof is inversely proportional to the cube or the square of the distance. Accordingly, by suppressing the electric field intensity in a distance of 3 meters from wireless facilities below a predetermined level, the proximity wireless transfer system can be weak wireless not having to get a wireless station license and can be configured at low costs. In addition, since such proximity wireless transfer carries out data communication by an electric field coupling system, it has advantages, such as being less in interferential influence due to small reflected waves from reflecting objects in the periphery and not having to consider hacking prevention and confidentiality security on the transmission path.

On the other hand, in wireless communication, a propagation loss becomes greater in accordance with the size of a propagation distance relative to the wavelength. In proximity wireless transfer utilizing a wideband signal of a high frequency as a UWB signal, the communication distance of approximately 3 cm is equivalent roughly to a half wavelength. That is, although the communication distance is proximate, it is a non-negligible length and the propagation loss is desirably suppressed sufficiently low. In particular, the issue of characteristic impedance is more serious in a high frequency circuit compared to a low frequency circuit, and the influence due to impedance mismatch is exposed at a coupling point between the electrodes of the transmitter and the receiver. For example, even when the transmission path of a high frequency electric field signal connecting the sending circuit unit 11 and the sending electrode 14 is a coaxial line of impedance matched at, for example, 50Ω, if the impedance is mismatched in the portion of coupling the sending electrode 14 and the receiving electrode 24, the electric field signal is reflected to generate a propagation loss, so that the communication efficiency decreases.

With that, each high frequency coupler disposed in the transmitter 10 and the receiver 20 has the impedance matched by connecting resonator units formed of the flat plate electrodes 14 and 24, series inductors 12 and 22, and parallel inductors 13 and 23 to the high frequency signal transmission paths. The high frequency signal transmission path in this context can be configured with a coaxial cable, a microstrip line, a coplanar line, or the like. When such high frequency couplers are disposed to be facing, the coupling portion acts as a bandpass filter in extremely close distances where a quasi-electrostatic field is dominant and a high frequency signal can be transmitted. In addition, even in distances in which an inductive electric field is dominant and which are non-negligible relative to the wavelength, a high frequency signal can be transmitted efficiently between the two high frequency couplers via the charges accumulated respectively in the coupling electrodes and the ground and the inductive electric field generated from a small dipole (described later) formed by mirror charges.

Here, when simply impedance matching between the electrodes, that is at the coupling portion, of the transmitter 10 and the receiver 20 is intended to suppress the reflected waves, it is possible to design each coupler so as to make the impedance continuous in the coupling portion even in a simple structure in which the flat plate electrodes 14 and 24 and the series inductors 12 and 22 are connected in series on the high frequency signal transmission paths. However, since the characteristic impedance does not change in front and back of the coupling portion, the magnitude of the current does not change, either. In contrast, by being equipped with the parallel inductors 13 and 23, greater charges can be sent into the coupling electrode 14 to generate a strong electric field coupling action between the coupling electrodes 14 and 24. In addition, when a great electric field is induced in the vicinity of a surface of the coupling electrode 14, the generated electric field propagates from the surface of the coupling electrode 14 as an electric field signal of longitudinal waves vibrating in a direction of a small dipole (described later). The electric field waves enable an electric field signal to propagate even in a case of a relatively great distance (phase length) between the coupling electrodes 14 and 24.

To sum up the above description, in a proximity wireless transfer system by a weak UWB communication system, a high frequency coupler is desired to satisfy the following conditions:

(1) to have a coupling electrode for electric field coupling at a position separated by a negligible height relative to the wavelength of a high frequency signal facing the ground;

(2) to have a resonator unit for coupling with a stronger electric field; and (3) to set a constant of the resonator unit so as to match the impedance when disposing the coupling electrodes facing to each other in a frequency band used for communication.

In the proximity wireless transfer system illustrated in FIG. 1, as the respective coupling electrodes 14 and 24 of the transmitter 10 and the receiver 20 face apart by an appropriate distance, the two high frequency couplers act as a bandpass filter to pass an electric field signal of a desired high frequency band, and also as stand alone high frequency couplers, they act as impedance conversion circuits to amplify a current and a current with a great amplitude flows into the coupling electrodes. On the other hand, when a high frequency coupler is placed alone in a free space, since input impedance of the high frequency coupler does not match the characteristic impedance of the high frequency signal transmission path, the signal inputted to the high frequency signal transmission path is reflected in the high frequency coupler and is not radiated to the outside, so that there is no influence on other adjacent communication systems. That is, when there is no another end of communication, the transmitter side does not release the radio waves as antennas in the past used to, but transmits a high frequency electric field signal by matching the impedance only when another communication end comes closer.

In the high frequency couplers illustrated in FIG. 1, the operating frequencies of the impedance matching portions are determined by each constant of the parallel inductors and the series inductors. However, the bandwidth of a lumped constant circuit is generally narrower in a high frequency circuit than in a distributed constant circuit, and also the constant of an inductor becomes smaller when the frequency is high, so that there is an issue of a drift in the operating frequency due to the variations in these constants. To cope with this, a method is considered to provide a wider bandwidth by configuring a high frequency coupler with an impedance matching portion and a resonator unit using a distributed constant circuit instead of a lumped constant circuit.

Figure 2A:
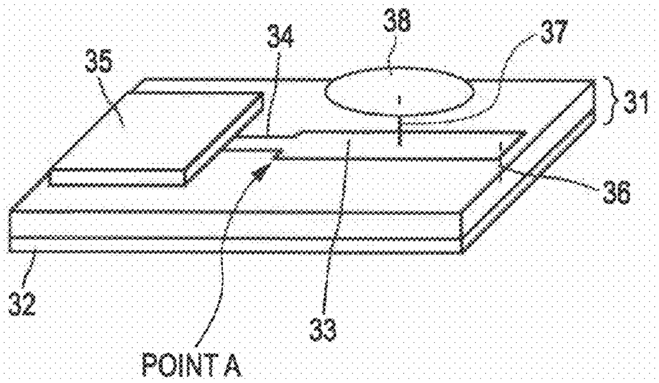
FIG. 2A illustrates a configuration example of a high frequency coupler using a distributed constant circuit for a resonator unit.

FIG. 2A illustrates a configuration example of a high frequency coupler using a distributed constant circuit for a resonator unit. In the example of the illustration, a high frequency coupler is placed on a printed board 31 having a ground conductor 32 formed on a lower face and also a printed pattern formed on an upper face. As a resonator unit for the high frequency coupler, a microstrip line or a coplanar waveguide, that is, a stub 33 is formed acting as a distributed constant circuit in place of the parallel inductor and the series inductor and is wired to the sending and receiving circuit module 35 via a signal line pattern 34, which is a high frequency signal transmission path. The stub 33 has a tip end connected to a ground 32 on the lower face via a through hole 36 penetrating the printed board 31 to be short-circuited. The stub 33 is, near the center, connected to a coupling electrode 38 via one terminal 37 formed of a thin metal wire.

The "stub" in the technical field of electronic engineering is a collective term for electric wires having one connected end and the other end that is unconnected or ground connected, and is equipped in the middle of a circuit for applications, such as adjustment, measurement, impedance matching, and filtering.

Figure 2B:
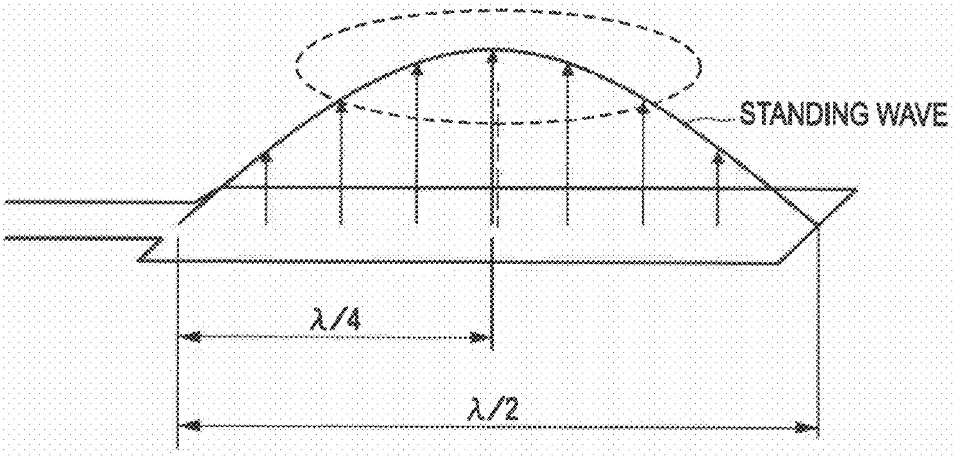
FIG. 2B illustrates a situation of a standing wave generation on a stub in the high frequency coupler illustrated in FIG. 2A.

Here, a signal inputted from the sending and receiving circuit 35 via the signal line pattern 34 is reflected at a tip end of the stub 33 and standing waves rise in the stub 33. The phase length of the stub 33 is approximately a half wavelength (180 degrees in phase) of the high frequency signal, and the signal line pattern 34 and the stub 33 are formed by a microstrip line, a coplanar line, or the like on the printed board 31. As illustrated in FIG. 2B, when the stub 33 has a phase length of a half wavelength and a tip end being short-circuited, the voltage amplitude of standing waves generated in the stub 33 becomes 0 at a tip end of the stub 33 and becomes maximum at the center of the stub 33, that is, at a quarter wavelength (90 degrees) from a tip end of the stub 33. By connecting the coupling electrode 38 to near the center of the stub 33, where the voltage amplitude of the standing wave becomes maximum, with one terminal 37, a high frequency coupler of efficient propagation can be made.

The stub 33 illustrated in FIG. 2A is a microstrip line or a coplanar waveguide on the printed board 31, and since the direct current resistance is small, a loss even of a high frequency signal is less and the propagation loss can be less between the high frequency couplers. In addition, since the size of the stub 33 configuring the distributed constant circuit is as large as approximately a half wavelength of the high frequency signal, errors in the dimensions due to the tolerance upon manufacture are slight in comparison to the overall phase length and the characteristics are not easily varied.

Figure 3:
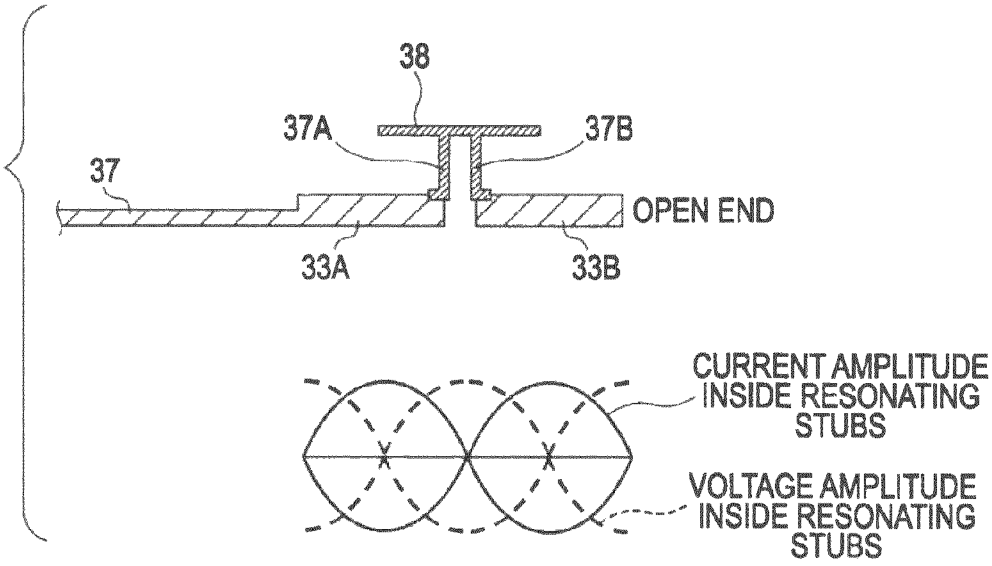
FIG. 3 illustrates another configuration example of a high frequency coupler using a distributed constant circuit for a resonator unit and standing waves generated on stubs.

FIG. 3 illustrates another configuration example of a high frequency coupler using a distributed constant circuit for a resonator unit. In the example of the illustration, a resonating stub is cut into two and is configured by connecting respective stubs 33A and 33B in such a manner that two connecting terminals 37A and 37B respectively in front and back supporting the coupling electrode 38 step over the cut portion. The tip end side of the stub 33B, which is one of the two cut portions, is an open end. Similar to the configuration example illustrated in FIG. 2A, the coupling electrode 38 is desirably disposed near a position of greater amplitude of the voltage standing wave.

In addition, FIG. 3 illustrates respective amplitudes of both the voltage standing waves and the current standing waves inside the stubs 33A and 33B. As illustrated, voltage standing waves rise that become maximum respectively in the open end at the tip end of the stub 33B, which is on the tip end side of what is cut into two, and an input end of the stub 33A on the root side, and the current standing waves have a phase difference by $\pi/4$ relative to such voltage standing waves. Accordingly, when the overall length (phase length) of the stubs 33A and 33B cut as illustrated, the two connecting terminals 37A and 37B, and the coupling electrode 38 in total is set approximately 360 degrees, that is, approximately one wavelength in terms of the phase length of the resonance frequency, the amplitude of the voltage standing waves becomes greater approximately at the center thereof, so that it is preferred to cut the stub 33 into two approximately at the center and also to mount the coupling electrode 38 so as to connect the cut portion with the two terminals 37A and 37B.

Here, a consideration is given to the electromagnetic fields generated in the coupling electrode of the high frequency coupler.

As illustrated in FIG. 1, the coupling electrode 14 is connected to one end of the high frequency signal transmission path, and a high frequency signal outputted from the sending circuit unit 11 flows in to accumulate the charges. At this point, the current flowing into the coupling electrode 14 via the transmission path is amplified due to the resonant action of the resonator unit formed of the series inductor 12 and the parallel inductor 13 to accumulate greater charges.

In addition, a ground 18 is disposed so as to face the coupling electrode 14 and separated by a negligible height (phase length) relative to the wavelength of a high frequency signal. Then, as the charges are accumulated in the coupling electrode 14 as described above, mirror charges are accumulated in the ground 18. As point charges Q are located outside a planar conductor, mirror charges −Q (that are virtual and have a displaced surface charge distribution) are disposed in the planar conductor, which is widely understood in the industry as described in, for example, "Electromagnetism" (Published by Shokabo, pages 54 to 57) written by Tadashi Mizoguchi.

As a result of accumulating the point charges Q and the mirror charges −Q as described above, a small dipole is formed that is composed of a line segment connecting the center of the charges accumulated in the coupling electrode 14 and the center of the mirror charges −Q accumulated in the ground 18. Strictly, the charges Q and the mirror charges −Q have a volume and the small dipole is formed so as to connect the center of the charges and the center of the mirror charges. The "small dipole" in this context denotes "an electric dipole having a distance between the charges being very short". For example, such a "small dipole" is described in "Antenna/Radio Wave Propagation" (Published by Corona Publishing, pages 16 to 18) written by Yasuto Mushiake. Then, due to the small dipole, a transverse wave component $E_\theta$ of the electric field, a longitudinal wave component $E_R$ of the electric field, and a magnetic field $H_\phi$ around the small dipole are generated.

As illustrated in FIGS. 2A, 2B, and 3, even in a case of configuring the resonator unit with a distributed constant circuit, such as a stub, charges in the relationship of a mirror image to the charges accumulated in the coupling electrode are accumulated in the ground and a small dipole is formed similarly.

Figure 4:
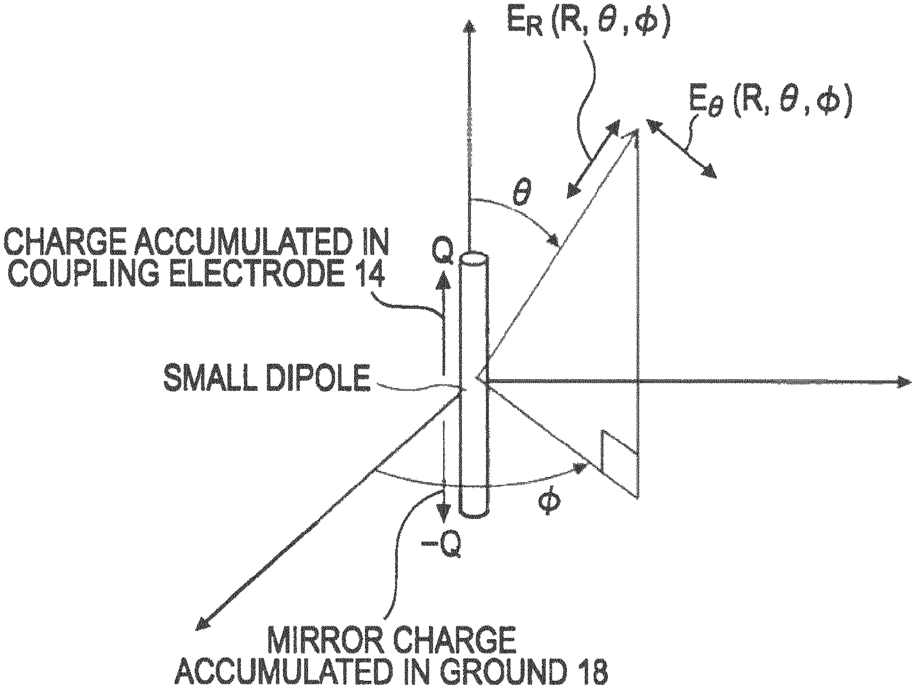
FIG. 4 illustrates an electric field by a small dipole.

FIG. 4 illustrates an electric field by the small dipole. As illustrated, the transverse wave component $E_\theta$ of the electric field vibrates in a direction vertical to the propagation direction, and the longitudinal wave component $E_R$ of the electric field vibrates in an orientation parallel to the propagation direction. In addition, the magnetic field $H_\phi$ is generated around the small dipole. Expressions (1) through (3) below represent the electromagnetic fields generated by the small dipole. In the expressions, a component inversely proportional to the cube of a distance R is an electrostatic field, a component inversely proportional to the square of the distance R is an inductive electric field, and a component inversely proportional to the distance R is a radiation electric field.

$$E_\theta = \frac{pe^{-jkR}}{4\pi\varepsilon}\left(\frac{1}{R^3} + \frac{jk}{R^2} - \frac{k^2}{R}\right)\sin\theta \tag{1}$$

$$E_R = \frac{pe^{-jkR}}{2\pi\varepsilon}\left(\frac{1}{R^3} + \frac{jk}{R^2}\right)\cos\theta \tag{2}$$

$$H_\phi = \frac{j\omega pe^{-jkR}}{4\pi}\left(\frac{1}{R^2} + \frac{jk}{R}\right)\sin\theta \tag{3}$$

In the proximity wireless transfer systems illustrated in FIGS. 1, 2A, 2B, and 3, in order to suppress interference waves to peripheral systems, it is considered preferable to suppress the transverse wave $E_\theta$ including a radiation electric field component while utilizing the longitudinal wave $E_R$ not including a radiation electric field component. This is because, as seen from the above expressions (1) and (2), the transverse wave $E_\theta$ of the electric field includes the radiation electric field that is inversely proportional to the distance (that is, small in distance attenuation), whereas the longitudinal wave $E_R$ does not include the radiation electric field.

Figure 5:
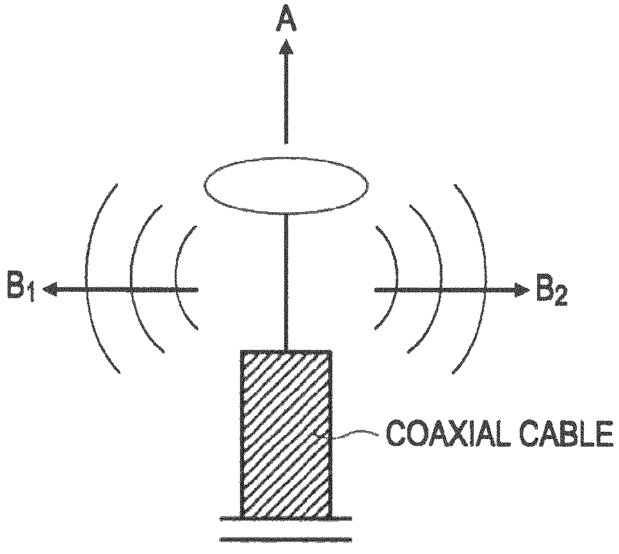
FIG. 5 illustrates a configuration example of a capacitance loaded antenna.

Firstly, in order not to generate the transverse wave $E_\theta$ of the electric field, the high frequency coupler is desired not to behave as an antenna. A coupling electrode supported by one terminal is seemingly similar in the structure to a "capacitance loaded" antenna, in which a metal is mounted at a tip end of an antenna element to give capacitance and reduce the height of the antenna. Accordingly, the high frequency coupler is desired not to behave as a capacitance loaded antenna. FIG. 5 illustrates a configuration example of a capacitance loaded antenna, and in FIG. 5, the longitudinal wave component $E_R$ of the electric field is generated mainly in the direction of an arrow A and also the transverse wave component $E_\theta$ of the electric field is generated in the directions of arrows $B_1$ and $B_2$.

In the configuration example of the coupling electrode illustrated in FIGS. 2A and 2B, the terminal 37 has both roles of avoiding coupling of the coupling electrode 38 and the ground conductor 32 and also of forming a series inductor. By securing a sufficient height from the ground conductor 32 to the coupling electrode 38, electric field coupling of the ground conductor 32 and the coupling electrode 38 is avoided to secure the electric field coupling action to the high frequency coupler on the receiver side. In this regard, as the height of the coupling electrode 38 becomes higher, that is, the terminal 37 becomes in a non-negligible length relative to the used wavelength, the terminal 37 acts as a capacitance loaded antenna and the transverse wave component $E_\theta$ as illustrated in the directions of the arrows $B_1$ and $B_2$ in FIG. 5 is generated. Consequently, the height of the coupling electrode 38 has a condition to be in a length sufficient for configuring a series inductor desired to obtain the characteristics as a high frequency coupler by avoiding the coupling of the coupling electrode 38 and the ground conductor 32 and also to act as an impedance matching circuit and to be short to the extent not to make the radiation of unwanted radio waves $E_\theta$ due to the current flowing in the series inductor greater.

On the other hand, from the above expression (2), the longitudinal wave component $E_R$ is understood to be maximal at an angle θ=0 degrees relative to the direction of the small dipole. Accordingly, in order to carry out non-contact communication efficiently utilizing the longitudinal wave $E_R$ of the electric field, it is preferred to dispose a high frequency coupler on the other end of communication to be facing so as to make the angle θ relative to the direction of the small dipole to be approximately 0 degrees and for transmission of a high frequency electric field signal.

In addition, by the resonator unit, the current of the high frequency signal can be made greater that flows into the coupling electrode 14. As a result, the moment of the small dipole can be made greater that is formed by the charges accumulated in the coupling electrode 14 and the mirror charges on the ground 18 side, and a high frequency electric field signal formed of the longitudinal wave $E_R$ can be efficiently discharged towards a propagation direction that has the angle θ of approximately 0 degrees relative to the small dipole direction.

Figure 6A:
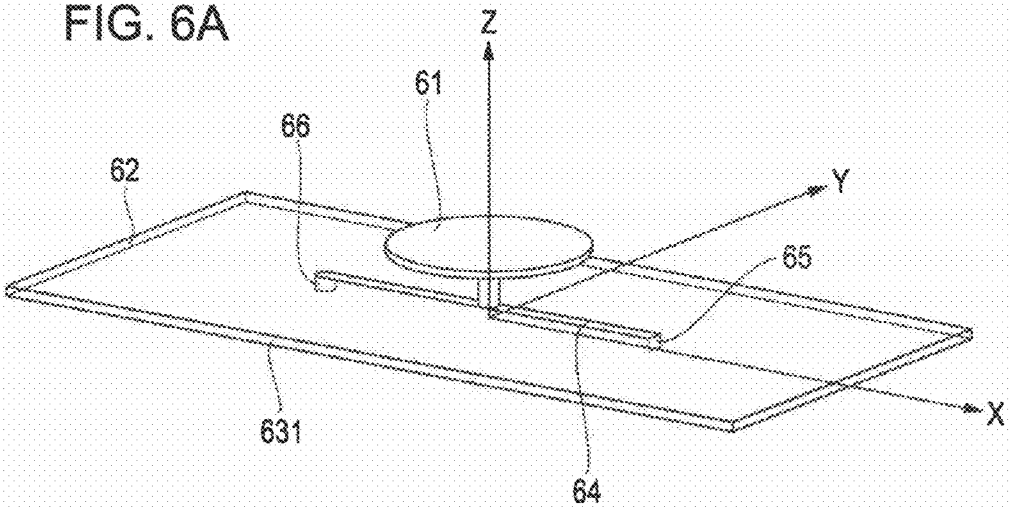
FIG. 6A is a perspective view illustrating a high frequency coupler model using a distributed constant circuit for a resonator unit.
Figure 6B:
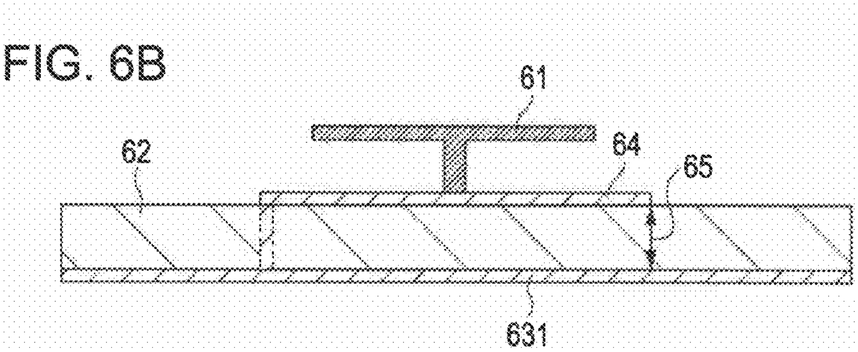
FIG. 6B is a cross-sectional view illustrates the high frequency coupler model using a distributed constant circuit for a resonator unit.

FIGS. 6A and 6B illustrate a high frequency coupler model using a distributed constant circuit for the resonator unit. FIG. 6A is a perspective view and FIG. 6B is a cross-sectional view. A coupling electrode 61 is implemented on a printed board 62 formed of a dielectric, the printed board 62 has a thickness of 0.56 mm and a relative dielectric constant of 4.5, and the printed board 62 has a lower face with a ground pattern formed thereon having dimensions of 40×20×0.05 mm and also has an upper face with a microstrip line 64 formed thereon that behaves as a resonator unit formed of a distributed constant circuit (stub). The microstrip line 64 has a thickness of 0.05 mm, a width of 1.0 mm, and a length of 18 mm, and is equipped with a feeding point 65 with characteristic impedance of 50Ω at one of the ends and the other end is connected to a ground pattern 63 on the lower face side via a through hole 66 having a radius of 0.5 mm. The coupling electrode 61 is a circular model having a radius of 4.75 mm, a thickness of 0.5 mm, and is mounted approximately at the center of the microstrip line 64 with a cylindrical terminal having a radius of 0.5 mm and a height of 2.5 mm.

Figure 6C:
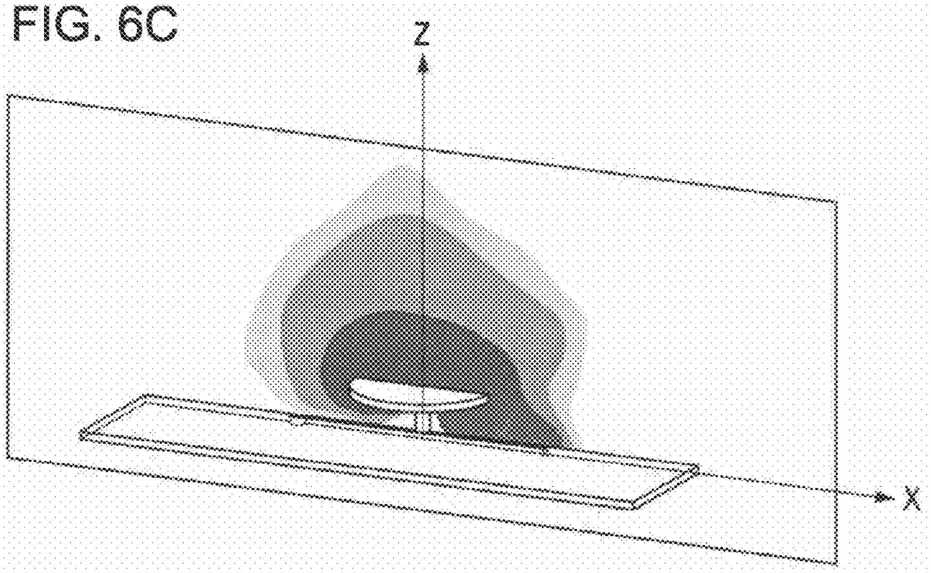
FIG. 6C illustrates an electric field intensity distribution of a simulation analysis on the high frequency coupler illustrated in FIGS. 6A and 6B.
Figure 7:
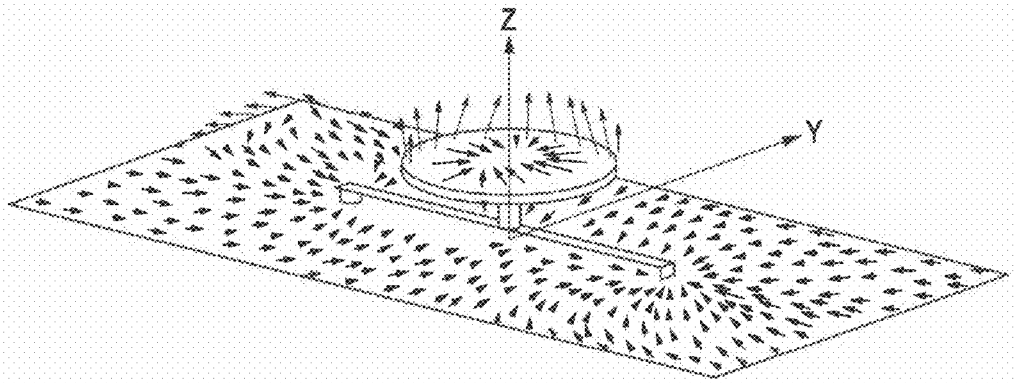
FIG. 7 illustrates a current vector distribution on a metal surface in a case of a certain phase of a simulation analysis on the high frequency coupler illustrated in FIGS. 6A and 6B.

FIG. 6C illustrates an electric field intensity distribution (regarding the XZ plane of FIG. 6A) of a simulation analysis on the high frequency coupler illustrated in FIGS. 6A and 6B. FIG. 7 illustrates a vector distribution of a current on a metal surface in a case of a certain phase of a simulation analysis on the high frequency coupler illustrated in FIGS. 6A and 6B. In this regard, the analysis frequency is supposed to be at 4.5 GHz.

It is found that the electric fields are concentrated in the Z axis direction of the coupling electrode 61 from FIG. 6C. Although these electric fields are concentrated in the vicinity of the coupling electrode 61, they do not efficiently radiate as an antenna. That is to say, it shows the distribution of an electrostatic field or an inductive electric field, which represents that the design is made as a basic high frequency coupler.

It is also found that the current distribution is also distributed to be focused at the center of the coupling electrode 61 from FIG. 7. In addition, the current distribution spread in the ground pattern 63 is also distributed orientated towards the center similarly. In a case of an opposite phase, the orientations of these currents are naturally distributed in the opposite orientations.

Here, a consideration is given to the charge distribution spread in the ground. The results of analysis illustrated FIGS. 6C and 7 represent that the charges are accumulated in the coupling electrode 61. In such a case, as described with reference to FIG. 4, the mirror charges can be considered to be accumulated on the ground side.

Figure 8:
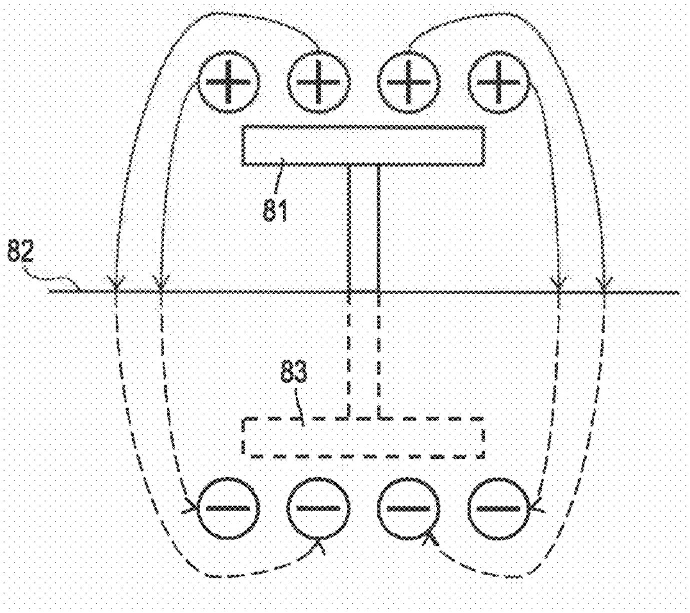
FIG. 8 conceptually illustrates a distribution of charges and lines of electric force generated in a high frequency coupler.

FIG. 8 conceptually illustrates the charge distribution and the lines of electric force generated in the high frequency coupler. As illustrated, when charges with a positive sign (+) are accumulated in the coupling electrode 81, the lines of electric force from the positive charges reach the ground plane 82 vertically. Then, it can be assumed that an imaginary electrode 83 exists symmetrically to the coupling electrode 81 about the ground plane 82 and mirror charges with a negative sign (−) are accumulated in the imaginary electrode 83. Accordingly, the lines of electric force reaching the ground plane 82 are directed towards the negative charges. That is to say, the presence of the coupling electrode 81 having positive charges enables to generate the imaginary electrode 83 having negative charges as illustrated by the dotted lines in FIG. 8. Naturally, depending on the phase, there may be a case of the opposite sign (+/−) of the charges of the coupling electrode 81 and the imaginary electrode 83 illustrated in FIG. 8.

With the behavior of the mirror charges illustrated in FIG. 8 as an operation principle, the high frequency coupler can be provided with, other than a first coupling electrode connected to the high frequency signal transmission path, a second coupling electrode in which the charges with the opposite sign is concentrated. Although the second coupling electrode is formed at a site symmetrical to the first coupling electrode, it is designed to use the ground for the first resonator unit as a second resonator unit different from the imaginary electrode in FIG. 8. It is also an actual electrode connected to the second resonator unit. The communication spot of the second coupling electrode is symmetrical to that of the first coupling electrode about the ground plane. In other words, such a high frequency coupler can have a plurality of communication spots for each coupling electrode.

Figure 9:
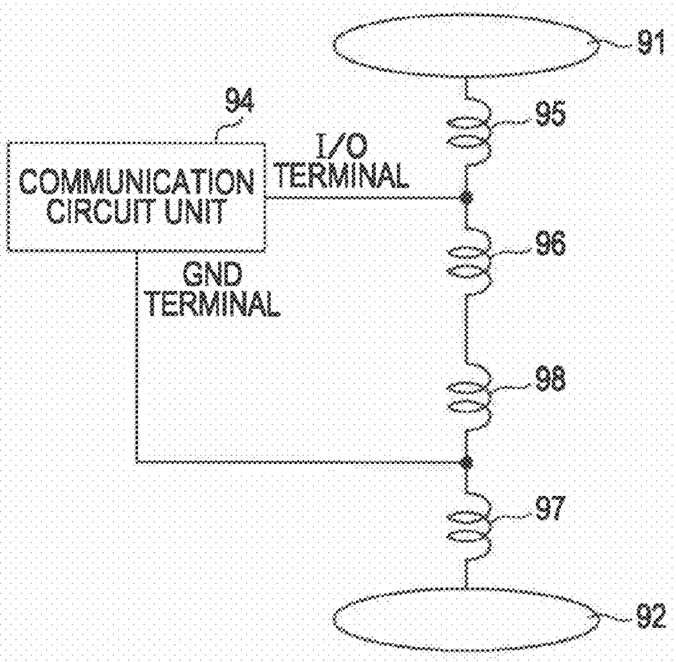
FIG. 9 illustrates a configuration example (a case of using a lumped constant circuit for a resonator unit) of a high frequency coupler having a ground for a first resonator unit designed as a second resonator unit and provided with a first coupling electrode and a second coupling electrode.

FIG. 9 illustrates a configuration example of a high frequency coupler provided with a first coupling electrode 91 and a second coupling electrode 92. In the example of the illustration, the resonator units are configured using series inductors and parallel inductors that are lumped constant circuits.

The first coupling electrode 91 is connected to an input and output (I/O) terminal of a communication circuit unit 94 via a high frequency signal transmission path. The high frequency signal transmission path in this context can be configured with a coaxial cable, a microstrip line, a coplanar line, or the like. In addition, this high frequency signal transmission path is connected to a first series inductor 95 and a first parallel inductor 96. It is similar to the above that the impedance is matched by the first series inductor 95 and the first parallel inductor 96.

In addition, the second coupling electrode 92 is connected to a ground terminal of the communication circuit unit 94 via a high frequency signal transmission path. In addition, this high frequency signal transmission path is connected to a second series inductor 97 and a second parallel inductor 98. It is similar to the above that the impedance is matched by the second series inductor 97 and the second parallel inductor 98.

The second coupling electrode 92 is placed at a site symmetrical to the first coupling electrode 91. Then, charges with the sign opposite to that of the charges accumulated in the first coupling electrode 91 are accumulated in the second coupling electrode 92. As a result, the communication spot of the second coupling electrode 92 is symmetrical to that of the first coupling electrode 91. Accordingly, the illustrated high frequency coupler can have the two communication spots.

The communication circuit unit 94 processes communication of a signal of the terminal voltage between the input and output terminal connected to the first coupling electrode 91 and the ground terminal connected to the second coupling electrode 92 as a transmission and reception signal in the proximity wireless transfer.

Figure 10:
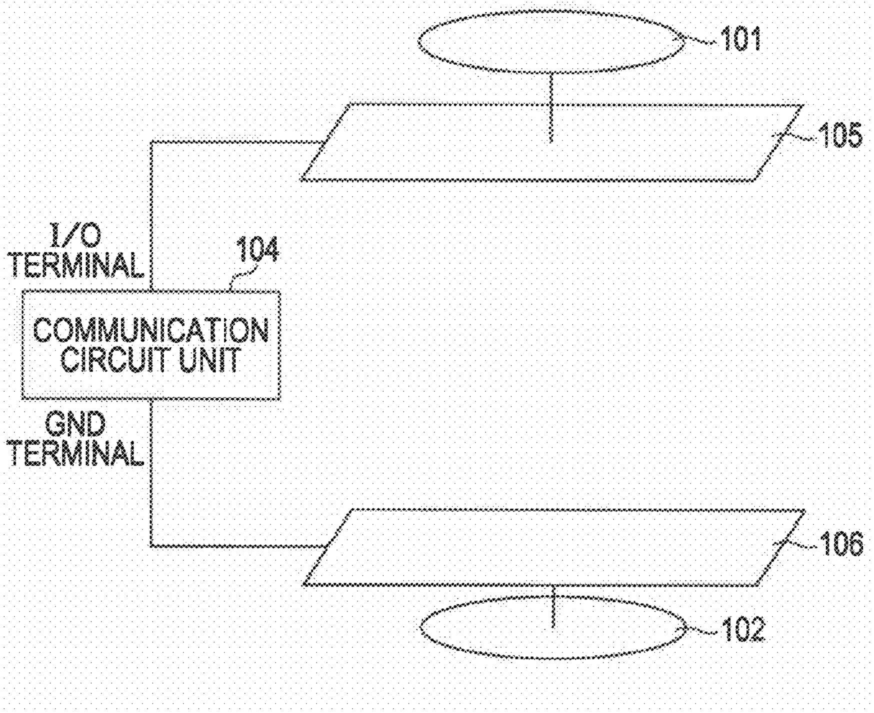
FIG. 10 illustrates a configuration example (a case of using a distributed constant circuit for a resonator unit) of a high frequency coupler having a ground for a first resonator unit designed as a second resonator unit and provided with a first coupling electrode and a second coupling electrode.

FIG. 10 illustrates another configuration example of a high frequency coupler provided with a first coupling electrode and a second coupling electrode that are symmetrical. The example of the illustration is different from FIG. 9 in that a resonator unit is configured using a stub that is a distributed constant circuit.

An input and output (I/O) terminal of a communication circuit unit 104 is connected to a first stub 105 acting as a distributed constant circuit. The first stub 105 is formed by, for example, a microstrip line, a coplanar waveguide, or the like implemented on a printed board (not shown). A signal inputted from the communication circuit unit 104 is reflected at a tip end of the first stub 105, and standing waves rise in the first stub 105 (refer to FIG. 3). Then, a first coupling electrode 101 is connected to a region of the first stub 105 in which the voltage amplitude of the standing waves becomes maximum.

On the other hand, the ground (GND) terminal of the communication circuit unit 104 is connected to a second stub 106 acting as a distributed constant circuit. Similar to the first stub 105, standing waves rise in the second stub 106 and a second coupling electrode 102 is connected to a region of the second stub 106 in which the voltage amplitude of the standing waves becomes maximum.

The second coupling electrode 102 is placed at a site symmetrical to the first coupling electrode 101. Then, charges with the sign opposite to the charges accumulated in the first coupling electrode 101 are accumulated in the second coupling electrode 102. As a result, the communication spot of the second coupling electrode 102 is symmetrical to that of the first coupling electrode 101. Accordingly, the high frequency coupler of the illustration can have the two communication spots.

The communication circuit unit 104 processes communication of a signal of the terminal voltage between the input and output terminal connected to the first coupling electrode 101 and the ground terminal connected to the second coupling electrode 102 as a transmission and reception signal in the proximity wireless transfer.

Although the configuration example of a high frequency coupler using the resonator unit illustrated in FIG. 2A is illustrated in FIG. 10, it may also naturally be a high frequency coupler using resonator units cut into two as illustrated in FIG. 3.

Figure 11A:
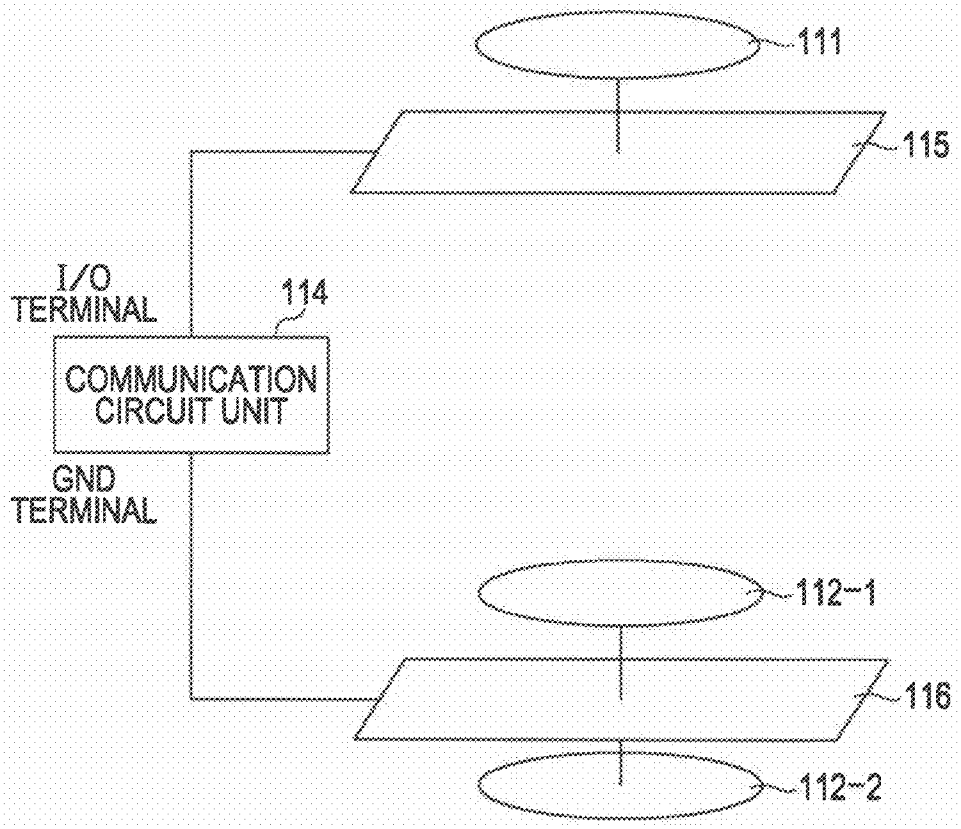
FIG. 11A illustrates a modification of the high frequency coupler illustrated in FIG. 10.
Figure 11B:
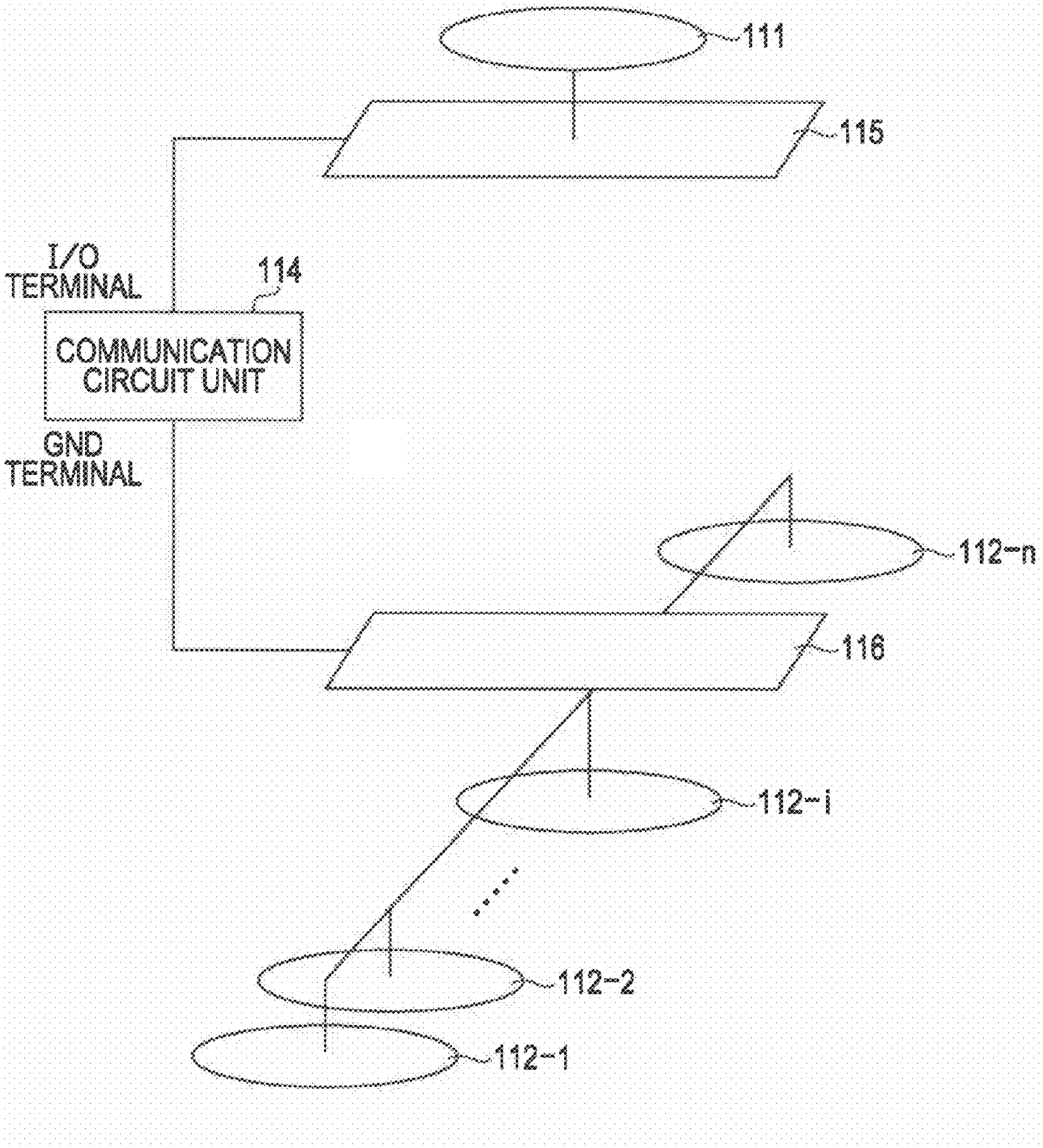
FIG. 11B illustrates another modification of the high frequency coupler illustrated in FIG. 10.

In addition, as illustrated in FIGS. 11A and 11B, a modification of FIG. 10 may include the configuration in which a plurality (n pieces) of second coupling electrodes 112-1, 112-2, . . . , and 112-n are connected in parallel to a ground terminal of a communication circuit unit 114 via a second stub 116 respectively. According to this modification, the respective second coupling electrodes 112-1, 112-2, . . . , and 112-n enable to obtain n pieces of communication spots that are almost symmetrical to a first coupling electrode 111, and the high frequency coupler turns out to have (n+1) pieces of communication spots as a whole.

Figure 12:
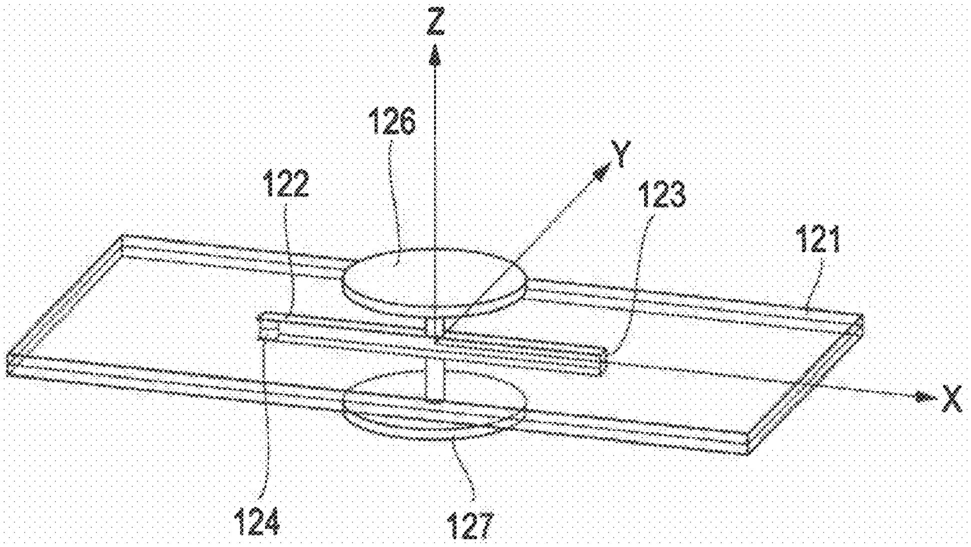
FIG. 12 illustrates a high frequency coupler provided with first and second coupling electrodes.

FIG. 12 illustrates a configuration example of a high frequency coupler having first and second coupling electrodes respectively implemented on respective upper and lower faces of a printed board formed of a dielectric. A printed board 121 has a structure in which two sheets of dielectrics having a thickness of 0.56 mm and a relative dielectric constant of 4.5 are bonded with each other and has a thickness of 0.56×2 mm as a whole. On an upper face of the printed board 121, a microstrip line 122 is formed that acts as a resonator unit formed of a distributed constant circuit (stub). The microstrip line 122 has a thickness of 0.05 mm, a width of 1.0 mm, and a length of 18 mm. In addition, on a lower face of the printed board 121, a microstrip line is also formed that is in a shape same as that formed on the upper face. One of the ends of the two microstrip lines formed on the upper and lower faces of the printed board 121 is equipped with a feeding point 123 having characteristic impedance of 50Ω, and the other end is connected to two microstrip lines via a through hole 124 having a radius of 0.5 mm. A first coupling electrode 126 is a circular model having a radius of 4.75 mm and a thickness of 0.5 mm, and is mounted approximately at the center of the microstrip line 122 formed on the upper face of the printed board 121 by a cylindrical terminal having a radius of 0.5 mm and a height of 2.5 mm. In addition, although a second coupling electrode 127 is in a shape same as that of the first coupling electrode 126, it is mounted approximately at the center of a microstrip line formed on the lower face of the printed board 121 at a position symmetrical to the first coupling electrode 126.

Figure 13A:
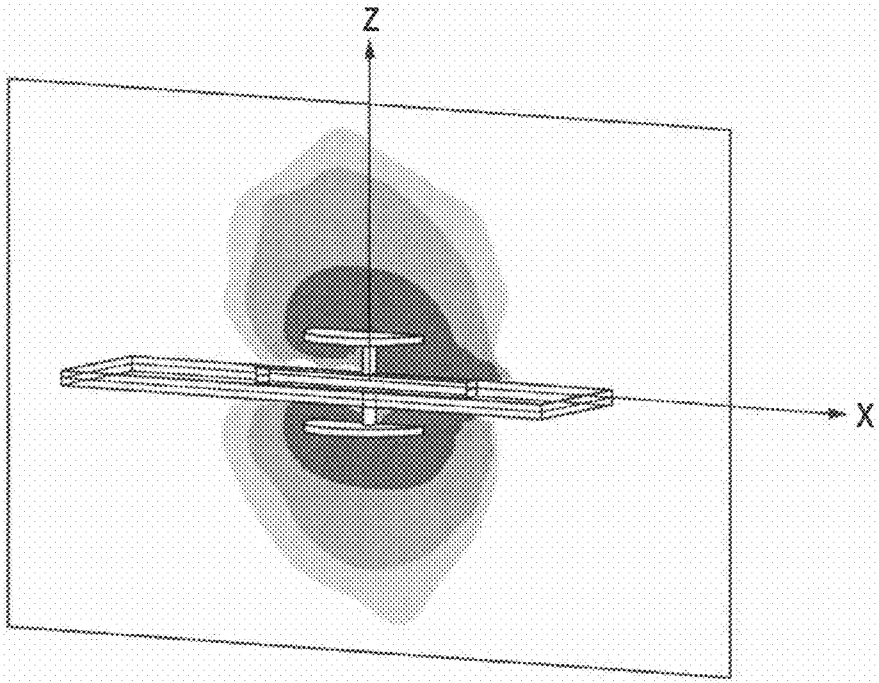
FIG. 13A illustrates an electric field intensity distribution (regarding the XZ plane in FIG. 12) of a simulation analysis on the high frequency coupler illustrated in FIG. 12.
Figure 13B:
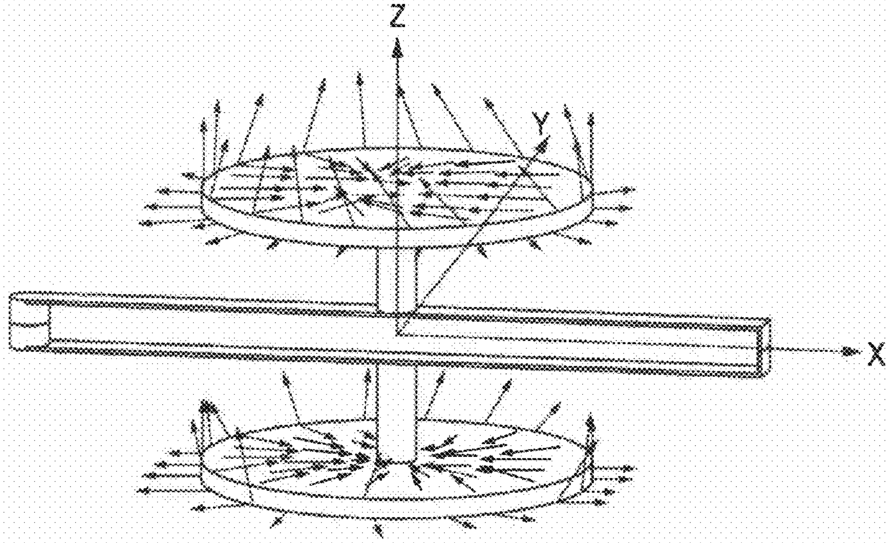
FIG. 13B illustrates a current vector distribution on a metal surface of each of the first and second coupling electrodes in a case of a certain phase of a simulation analysis on the high frequency coupler illustrated in FIG. 12.

FIG. 13A illustrates an electric field intensity distribution (regarding the XZ plane in FIG. 12) of a simulation analysis on the high frequency coupler illustrated in FIG. 12. FIG. 13B illustrates current vector distributions on respective metal surfaces of the first coupling electrode 126 and the second coupling electrode 127 in a case of a certain phase of a simulation analysis on the high frequency coupler illustrated in FIG. 12. In this regard, the analysis frequency is supposed to be at 4.5 GHz.

It is found that the electric fields are concentrated in the Z axis direction of the first coupling electrode 126 and the second coupling electrode 127 respectively from FIG. 13A. Although these electric fields are concentrated in the vicinity of the coupling electrode, they do not efficiently radiate as an antenna. That is to say, it shows the distribution of an electrostatic field or an inductive electric field, which represents that the design is made as a basic high frequency coupler.

It is also found that the current distribution is also distributed to be focused at the respective centers of the first coupling electrode 126 and the second coupling electrode 127 from FIG. 13B. In this regard, the orientation of the current becomes opposite in the first coupling electrode 126 and the second coupling electrode 127 to each other. It is found that the charges of opposite signs are accumulated in the first coupling electrode 126 and the second coupling electrode 127 from the current distribution illustrated in FIG. 13B. Accordingly, in a case of an opposite phase, the orientations of these currents are distributed in the opposite orientations.

From the results of the simulation analyses illustrated in FIGS. 13A and 13B, it is found that the electric fields generated from the first coupling electrode 126 and the electric fields generated from the second coupling electrode 127 are in opposite orientations to each other and the high frequency coupler has two communication spots as a whole.

In addition, although either of the coupling electrodes 126 and 127 has the electric fields concentrated in the vicinity of the electrode surfaces, they do not efficiently radiate as an antenna. That is to say, it shows the distribution of an electrostatic field or an inductive electric field, which represents that the design is made as a basic high frequency coupler.

Figure 14:
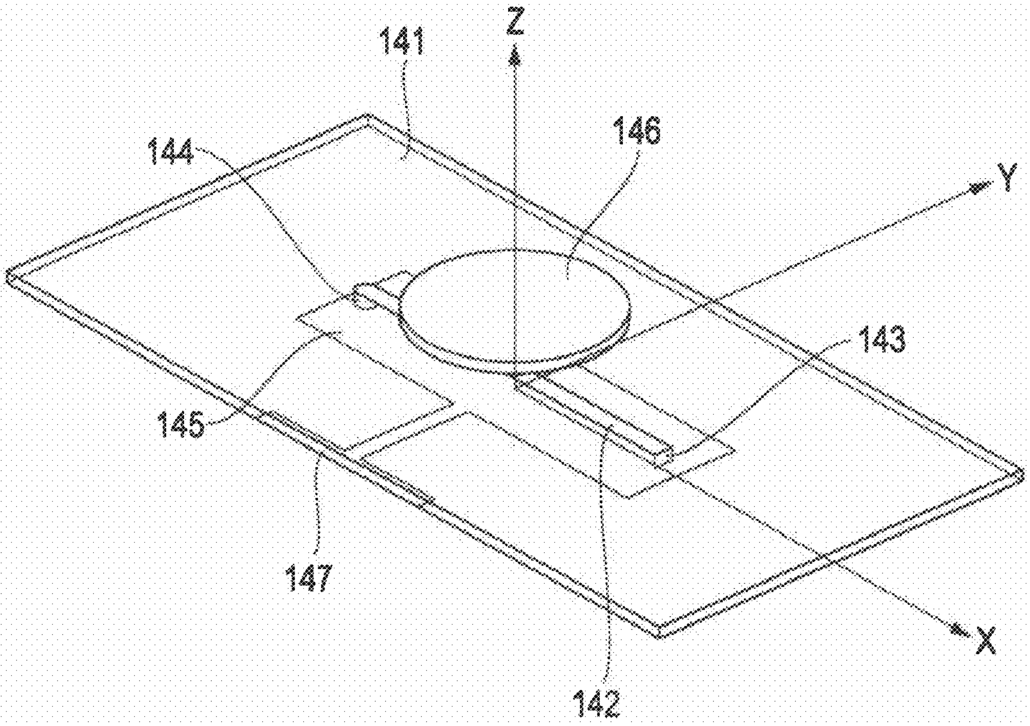
FIG. 14 illustrates another configuration example of a high frequency coupler provided with first and second coupling electrodes.

FIG. 14 illustrates another configuration example of a high frequency coupler provided with first and second coupling electrodes. In the configuration example illustrated in FIG. 12, the first coupling electrode 126 and the second coupling electrode 127 are almost in a same shape and the second coupling electrode 127 is mounted at a position symmetrical to the first coupling electrode 126 about the printed board 121 formed of a dielectric. In contrast, in the example illustrated in FIG. 14, a second coupling electrode 147 is configured as a conductor pattern in an approximately T shape projected from a ground pattern 145 on a ground plane of a printed board 141. That is, the second coupling electrode 147 is not symmetrical to a first coupling electrode 146 about the ground plane.

In FIG. 14, the printed board 141 has a thickness of 0.56 mm and a relative dielectric constant of 4.5, and the printed board 141 has a lower face (ground plane) with a ground pattern 145 formed thereon having dimensions of 40×20×0.05 mm and also has an upper face with a microstrip line 142 formed thereon that behaves as a resonator unit formed of a distributed constant circuit (stub). The microstrip line has a thickness of 0.05 mm, a width of 1.0 mm, and a length of 18 mm, and is equipped with a feeding point 143 with characteristic impedance of 50Ω at one of the ends and the other end is connected to a ground pattern 145 on the lower face side via a through hole 144 having a radius of 0.5 mm. The first coupling electrode 146 is a circular model having a radius of 4.75 mm, a thickness of 0.5 mm, and is mounted approximately at the center of the microstrip line 142 with a cylindrical terminal having a radius of 0.5 mm and a height of 2.5 mm. In addition, a ground immediately below the microstrip line 142 is 20×6×0.05 mm. Then, the ground pattern 145 of 1×6×0.05 mm is connected from approximately the center of a longitudinal side of the ground immediately below the microstrip line, and a ground pattern of 10×1×0.05 mm that behaves as the second coupling electrode 147 is formed further ahead.

Figure 15:
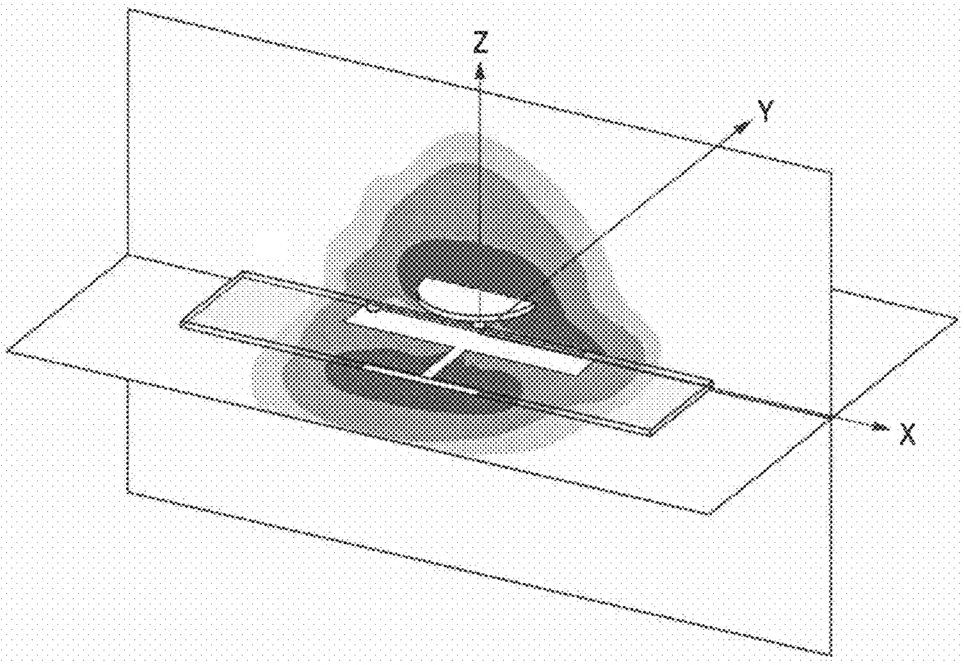
FIG. 15 illustrates electric field intensity distributions (regarding the XZ and XY planes in FIG. 14) of simulation analyses on the high frequency coupler illustrated in FIG. 14.

FIG. 15 illustrates electric field intensity distributions (regarding the XZ plane and the XY plane in FIG. 14) of simulation analyses on the high frequency coupler illustrated in FIG. 14. From FIG. 15, it can be confirmed that, while the electric fields in the Z axis direction in FIG. 15 is concentrated from the first coupling electrode 146, the electric fields are also concentrated in the Y axis direction in FIG. 15 from the second coupling electrode 147 formed as a part of the ground pattern 145 in an approximately T shape in the ground plane. That is, it is found that the electric fields generated from the first coupling electrode 146 and the electric fields generated from the second coupling electrode 147 make an angle of 90 degrees and the high frequency coupler illustrated in FIG. 14 have two communication spots as a whole.

In addition, although either of the coupling electrodes 146 and 147 has the electric fields concentrated in the vicinity of the electrode surfaces, they do not efficiently radiate as an antenna. That is to say, it shows the distribution of an electrostatic field or an inductive electric field, which represents that the design is made as a basic high frequency coupler.

Figure 16:
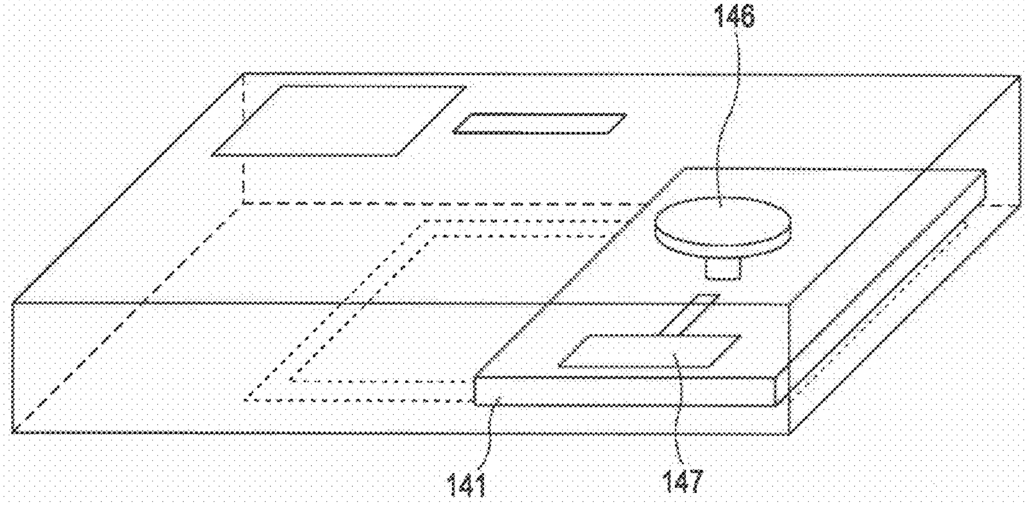
FIG. 16 illustrates a situation of a housing of an instrument equipped with the high frequency coupler illustrated in FIG. 14 therein.

FIG. 16 illustrates a situation in which an instrument is equipped with the high frequency coupler illustrated in FIG. 14 in housing. The instrument in this context is, for example, a mobile instrument, such as a digital camera or a mobile phone. When there is only one communication spot for a high frequency coupler, an event incapable of communication is prone to occur. In contrast, since the high frequency coupler illustrated in FIG. 14 has two communication spots in the Y axis and Z axis directions, it is facilitated to obtain an optimal communication situation with the other end of communication and enables communication of bulk information in various occasions.

Figure 17:
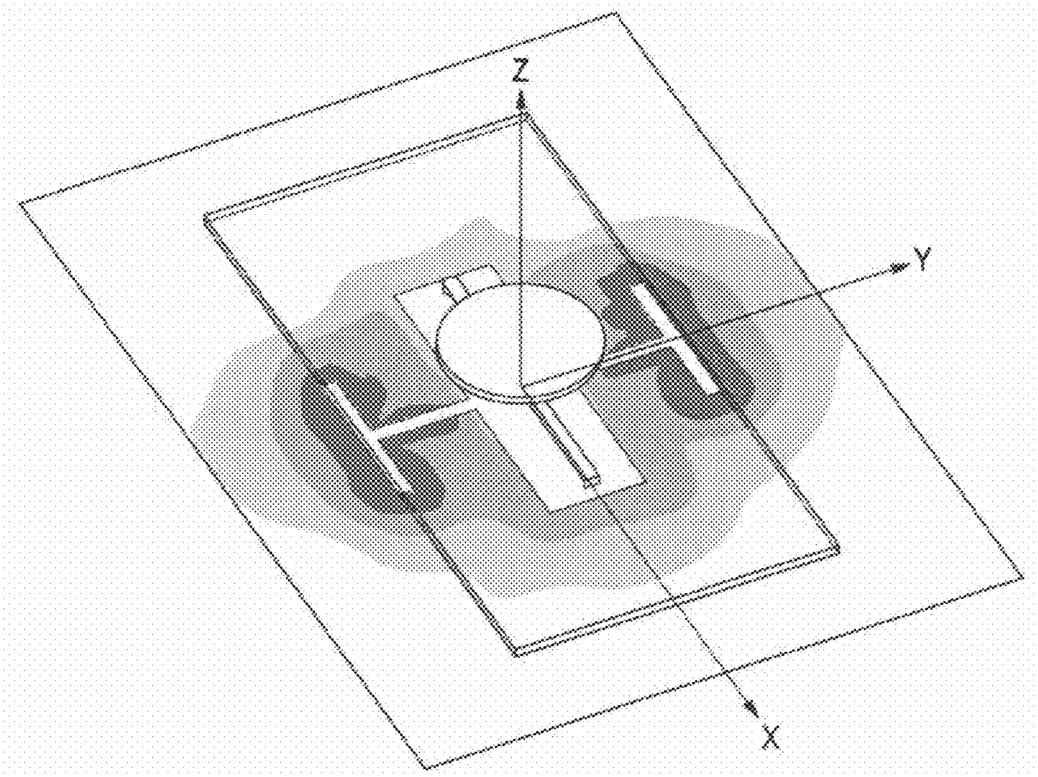
FIG. 17 illustrates a modification of the high frequency coupler illustrated in FIG. 14 together with an electric field intensity distribution (regarding the XY plane in FIG. 14) of a simulation analysis.

FIG. 17 illustrates a modification of the high frequency coupler illustrated in FIG. 14 together with an electric field intensity distribution (regarding the XY plane in FIG. 14) of a simulation analysis. In FIG. 17, a plurality (two) of second coupling electrodes formed of conductor patterns in an approximately T shapes are formed on the ground pattern. In FIG. 17, the two second coupling electrodes are formed as ground patterns in opposite orientations to each other in the Y axis direction (in other words, symmetrical about the X axis in the XY plane). Each configuration of the printed board, the first coupling electrode, the ground patterns, and the second coupling electrode is similar to that in FIG. 14. In addition, FIG. 18 illustrates electric field intensity distributions (regarding the XZ plane and the XY plane in FIG. 17) of simulation analyses on the high frequency coupler illustrated in FIG. 17.

Figure 18:
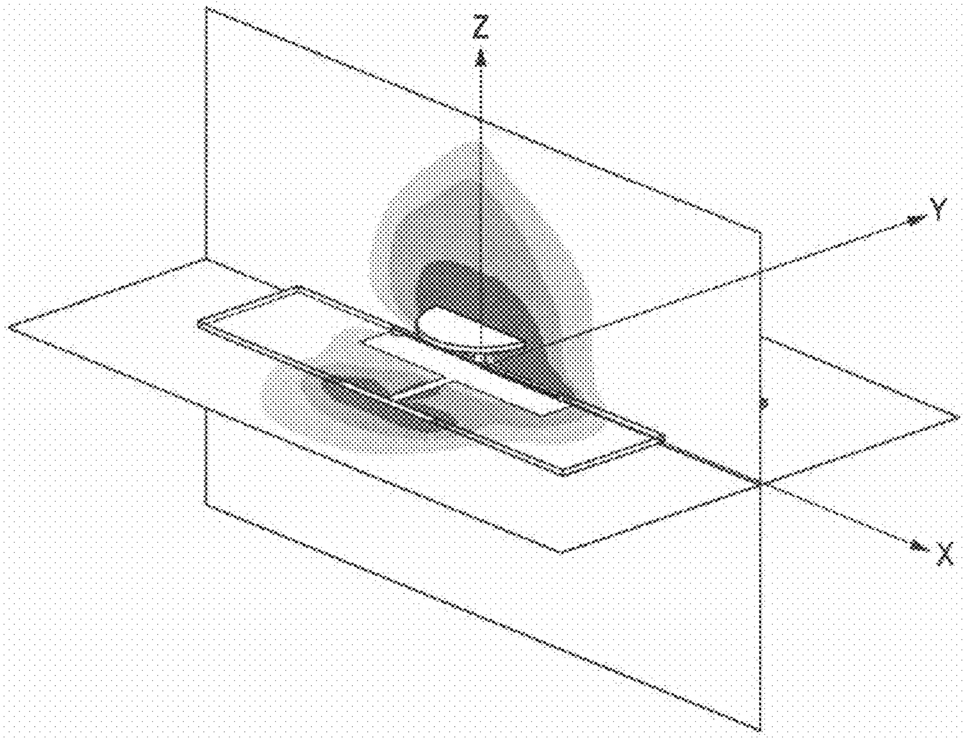
FIG. 18 illustrates electric field intensity distributions (regarding the XZ and XY planes in FIG. 17) of simulation analyses on the high frequency coupler illustrated in FIG. 17.

From FIG. 18, the electric fields in the Z axis direction in FIG. 18 are concentrated from the first coupling electrode, and the electric fields in the Y axis direction in FIG. 18 are concentrated from one of the two second coupling electrodes. That is, it can be confirmed that the electric fields generated from the first coupling electrode and the electric fields generated from the second coupling electrode make an angle of 90 degrees. From FIG. 17, the electric fields in opposite orientations to each other in the Y axis direction in FIG. 17 are concentrated respectively from the two second coupling electrodes formed as the ground patterns in opposite orientations to each other in the Y axis direction in FIG. 17. It can be confirmed that the electric fields generated from these two second coupling electrodes make respective angles of 90 degrees with the electric fields generated from the first coupling electrode.

It is just as already described that FIGS. 11A and 11B illustrate a high frequency coupler, as a modification of the high frequency coupler illustrated in FIG. 10, in which n pieces of second coupling electrodes are connected to a ground terminal of a communication circuit unit and that can obtain n pieces of communication spots symmetrical to a first coupling electrode about a ground plane and the high frequency coupler has (n+1) pieces of communication spots as a whole. In contrast, the high frequency coupler illustrated in FIG. 17 is provided with two second coupling electrodes different in the directions of coupling the electric fields on the ground plane, and thereby it can obtain communication spots in these two directions enabled to communicate and the high frequency coupler has three communication spots as a whole.

In addition, although any of the three coupling electrodes has the electric fields concentrated in the vicinity of the electrode surfaces, they do not efficiently radiate as an antenna. That is to say, it shows the distribution of an electrostatic field or an inductive electric field, which represents that the design is made as a basic high frequency coupler.

Figure 19A:
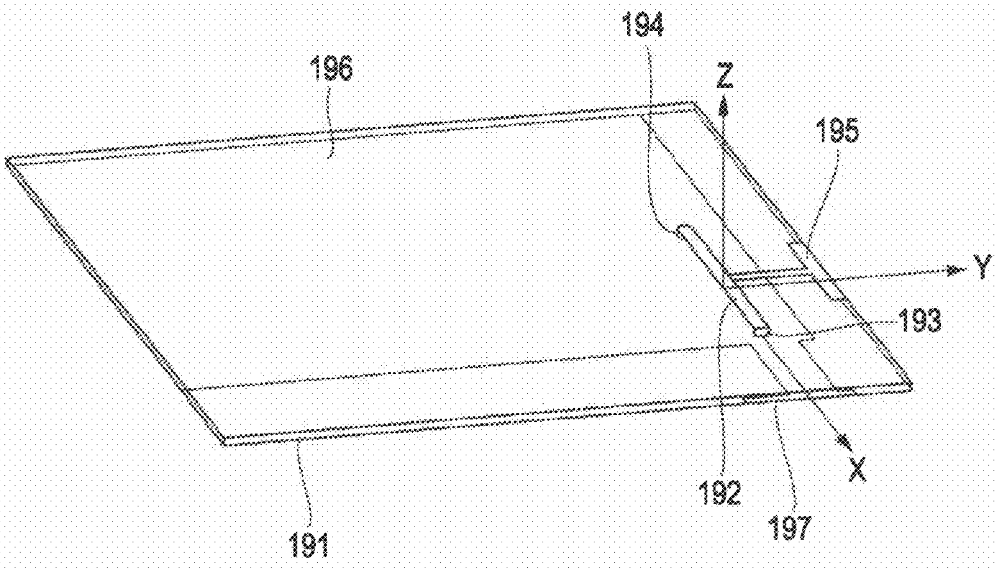
FIG. 19A is a perspective view illustrating a configuration example of forming all of a high frequency signal transmission path, a resonator unit, and first and second coupling electrodes as conductor patterns on an identical printed board.
Figure 19B:
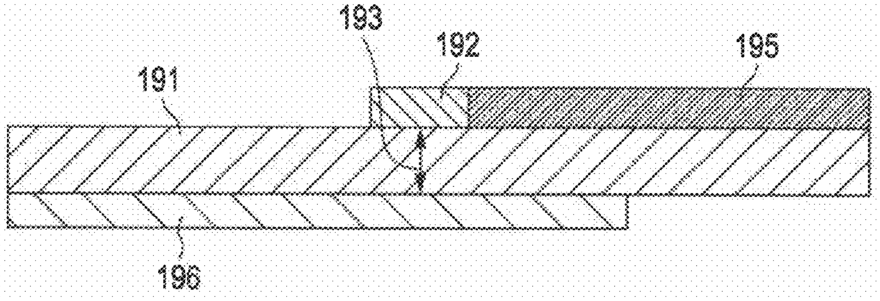
FIG. 19B is a cross-sectional view illustrating the configuration example of forming all of a high frequency signal transmission path, a resonator unit, and first and second coupling electrodes as conductor patterns on an identical printed board.

FIGS. 19A and 19B illustrate a configuration example in which all of a high frequency signal transmission path, a resonator unit, and first and second coupling electrodes are formed as a conductor pattern on an identical printed board. FIG. 19A is a perspective view, and FIG. 19B is a cross-sectional view.

A dielectric 191 having a thickness of 0.56 mm and a relative dielectric constant of 4.5 is formed on a ground plane having a thickness of 0.05 mm, and a microstrip line 192 having a thickness of 0.05 mm and a width of 1.0 mm is formed on the dielectric 191. The microstrip line 192 has a length of 18 mm and has one end equipped with a feeding point 193 with characteristic impedance of 50Ω and the other end connected to the ground plane via a through hole 194 having a radius of 0.5 mm. A first coupling electrode 195 is formed as a pattern in a same layer of this microstrip line 192. That is, the first coupling electrode 195 formed of a pattern of 10×1×0.05 mm is disposed towards the Y axis direction in FIG. 19A from the center of a longitudinal side of the microstrip line 192 behaving as a resonator unit (stub) via a pattern of 1×5×0.05 mm. A second coupling electrode 197 formed of a pattern of 1×7×0.05 mm is disposed towards the X axis direction in FIG. 19A via a pattern of 9×3×0.05 mm also at an end of a ground pattern 196 on the ground plane.

Figure 20:
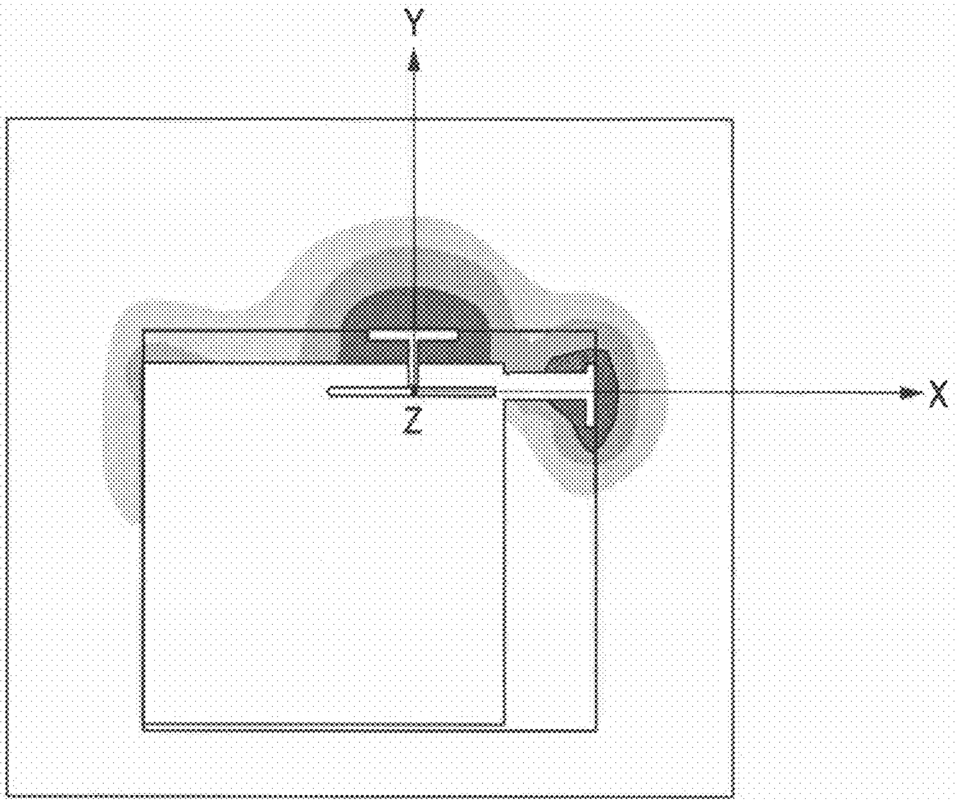
FIG. 20 illustrates an electric field intensity distribution (regarding the XY plane in FIG. 19A) of a simulation analysis on the high frequency coupler illustrated in FIGS. 19A and 19B.

FIG. 20 illustrates an electric field intensity distribution (regarding the XY plane in FIG. 19A) of a simulation analysis on the high frequency coupler illustrated in FIGS. 19A and 19B. In the first coupling electrode 195 and the second coupling electrode 197, charges with the signs opposite to each other are accumulated. From FIG. 20, it can be confirmed that, while the electric fields in the Y axis direction in FIG. 20 are concentrated from the first coupling electrode 195, the electric fields in the X axis direction in FIG. 20 are concentrated from the second coupling electrode 197 formed as a ground pattern in an approximately T shape in the ground plane. That is, it is found that the electric fields generated from the first coupling electrode 195 and the electric fields generated from the second coupling electrode 197 make an angle of 90 degrees in the XY plane and the high frequency coupler illustrated in FIGS. 19A and 19B as a whole is capable of communication by electric field coupling from two spots in the X axis direction and the Y axis direction.

Either of the coupling electrodes 195 and 197 has the electric fields concentrated in the vicinity of the electrode surfaces, they do not efficiently radiate as an antenna. That is to say, it shows the distribution of an electrostatic field or an inductive electric field, which represents that the design is made as a basic high frequency coupler.

Figure 21A:
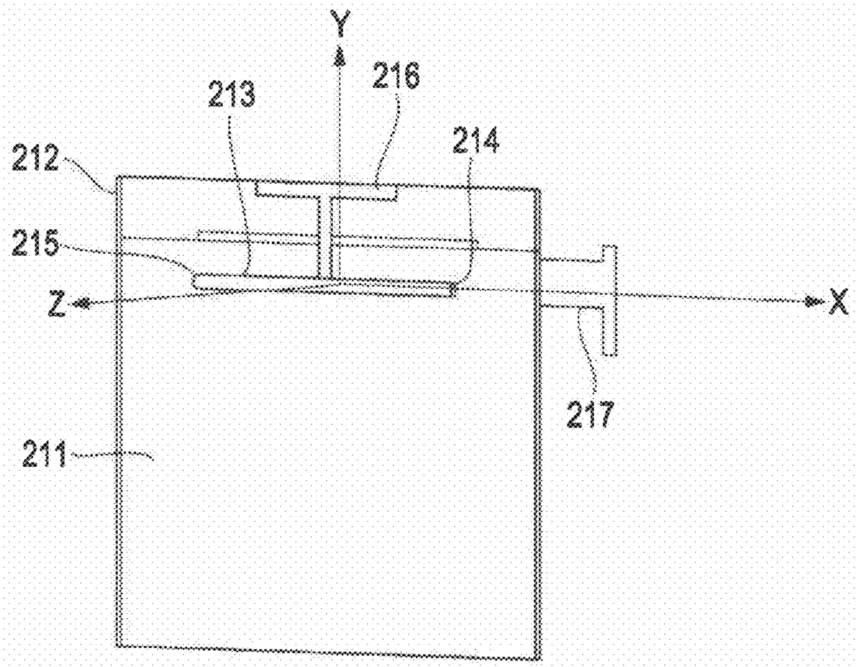
FIG. 21A is a top view illustrating a configuration example in which a high frequency signal transmission path, a resonator unit, and a first coupling electrode are formed as conductor patterns on an identical printed board and also a second coupling electrode is disposed separately from a ground plane of the printed board.
Figure 21B:
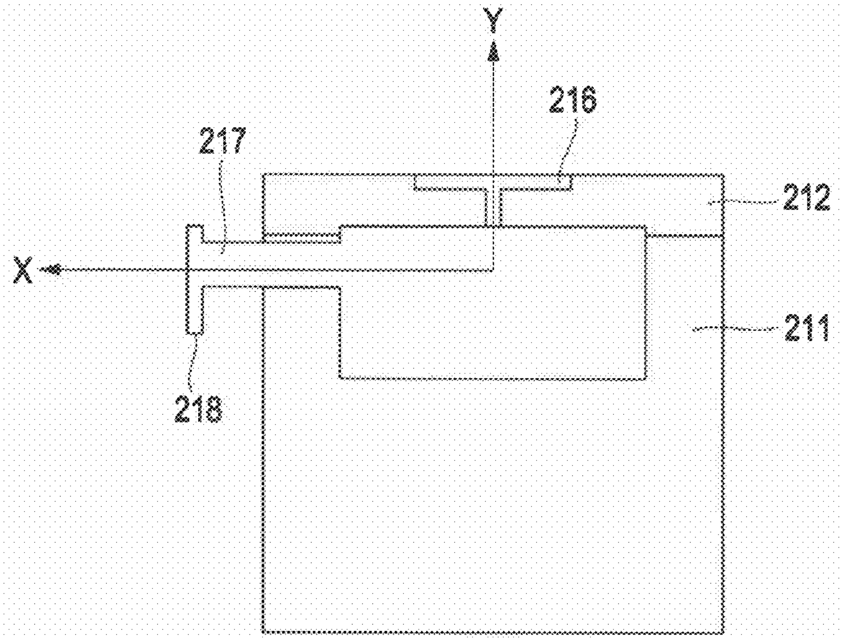
FIG. 21B is a bottom view illustrating the configuration example in which a high frequency signal transmission path, a resonator unit, and a first coupling electrode are formed as conductor patterns on an identical printed board and also a second coupling electrode is disposed separately from a ground plane of the printed board.
Figure 21C:
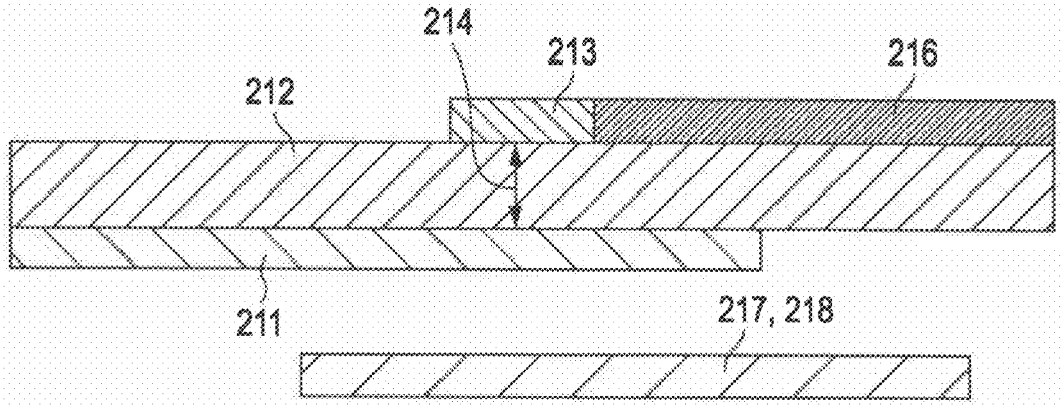
FIG. 21C is a cross-sectional view illustrating the configuration example in which a high frequency signal transmission path, a resonator unit, and a first coupling electrode are formed as conductor patterns on an identical printed board and also a second coupling electrode is disposed separately from a ground plane of the printed board.

FIGS. 21A, 21B, and 21C illustrate a configuration example in which a high frequency signal transmission path, a resonator unit, and a first coupling electrode are formed as conductor patterns on an identical printed board and also a second coupling electrode is disposed separately from a ground plane of the printed board. FIG. 21A is a top view, FIG. 21B is a bottom view, and FIG. 21C is a cross-sectional view.

A dielectric 212 having a thickness of 0.56 mm and a relative dielectric constant of 4.5 is formed on a ground plane 211 having a thickness of 0.05 mm and a microstrip line 213 having a thickness of 0.05 mm and a width of 1.0 mm is formed on this dielectric 212. The microstrip line 213 has a length of 18 mm and has one end equipped with a feeding point 214 with characteristic impedance of 50Ω and the other end connected to the ground plane 211 via a through hole 215 having a radius of 0.5 mm. A first coupling electrode 216 is formed as a pattern in a same layer of the microstrip line 213. That is, the first coupling electrode 216 formed of a pattern of 10×1×0.05 mm is disposed towards the Y axis direction in FIGS. 21A and 21B from the center of a longitudinal side of the microstrip line 213 behaving as a resonator unit (stub) via a pattern of 1×5×0.05 mm. On the other hand, another conductive layer 217 is disposed separately from the ground plane 211 by 0.95 mm. A second coupling electrode 218 formed of a pattern of 1×7×0.05 mm is formed towards the X axis direction in FIGS. 21A and 21B in an end of this conductive layer 217 via a pattern of 9×3×0.05 mm.

In a case that there is no conductive layer separated from the dielectric, as the charges are accumulated in the first coupling electrode 216, the mirror charges with the opposite sign appears symmetrically about the ground plane as illustrated in FIG. 8. In contrast, when the other conductive layer 217 is disposed separately from the ground 211 as illustrated in FIGS. 21A, 21B, 21C, charges with the sign opposite to the charges accumulated in the first coupling electrode 216 are generated in a projection of an approximately T shape of the conductive layer, so that it becomes possible to act as the second coupling electrode 218.

Figure 22:
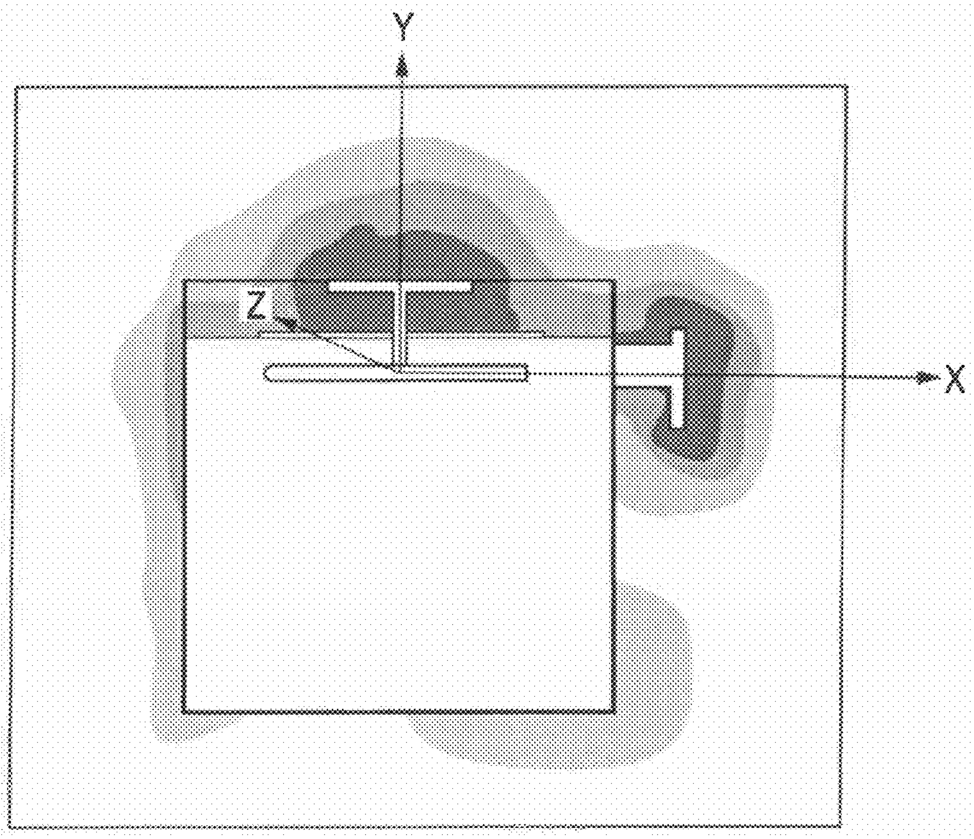
FIG. 22 illustrates an electric field intensity distribution (regarding the XY plane in FIGS. 21A and 21B) of a simulation analysis on the high frequency coupler illustrated in FIGS. 21A, 21B, and 21C.
Figure 23:
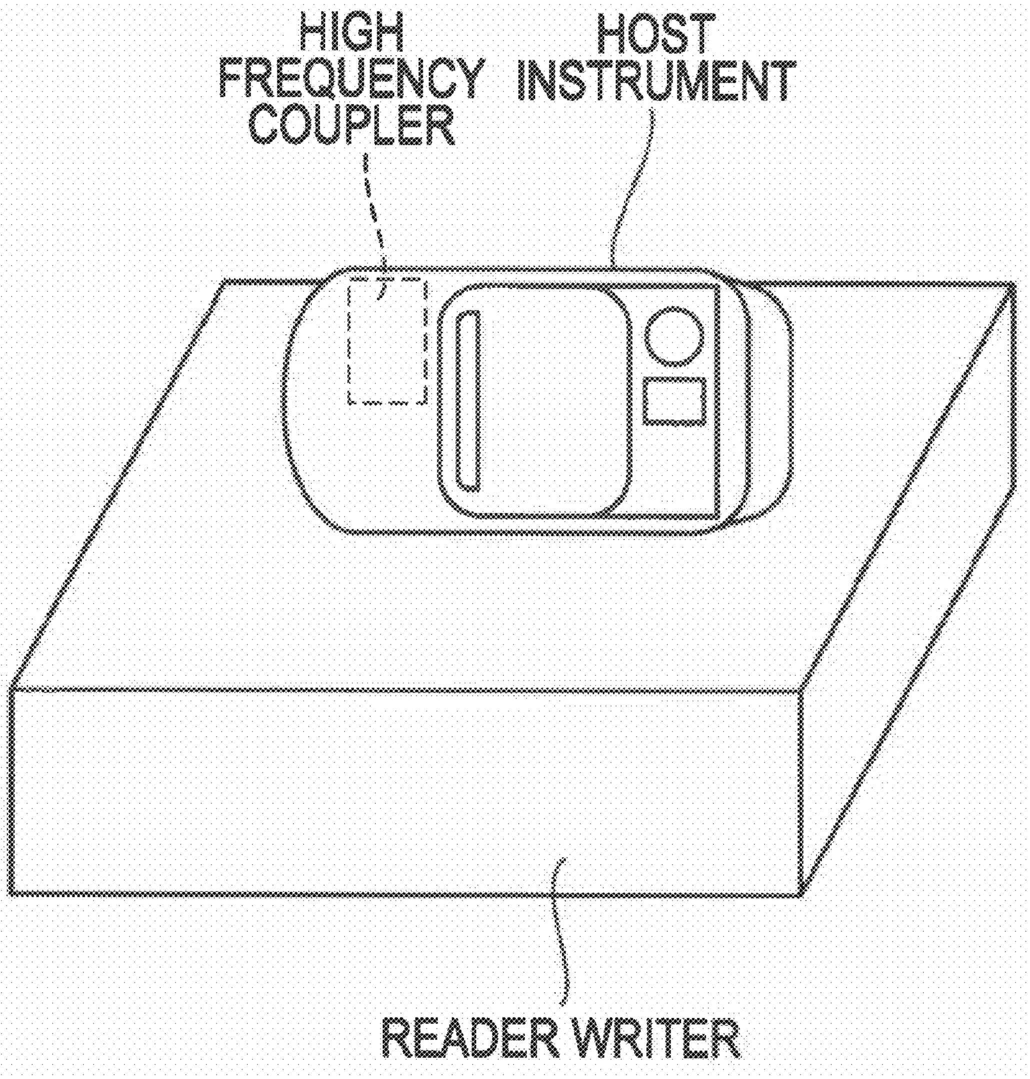
FIG. 23 illustrates a typical utilization form of a proximity wireless transfer system.

FIG. 22 illustrates an electric field intensity distribution (regarding the XY plane in FIGS. 21A and 21B) of a simulation analysis on the high frequency coupler illustrated in FIGS. 21A, 21B, and 21C. In the first coupling electrode 216 and the second coupling electrode 218, charges with the signs opposite to each other are accumulated. From FIG. 22, it can be confirmed that, while the electric fields in the Y axis direction in FIG. 22 are concentrated from the first coupling electrode 216, the electric fields in the X axis direction in FIG. 22 are concentrated from the second coupling electrode 218 formed as a ground pattern in an approximately T shape in the ground plane. That is, the electric fields generated from the first coupling electrode 216 and the electric fields generated from the second coupling electrode 218 make an angle of 90 degrees in the XY plane, and it is found that the high frequency coupler illustrated in FIGS. 21A, 21B, 21C as a whole is capable of communication by electric field coupling from two spots in the X axis direction and the Y axis direction.

Either of the coupling electrodes 216 and 218 has the electric fields concentrated in the vicinity of the electrode surfaces, they do not efficiently radiate as an antenna. That is to say, it shows the distribution of an electrostatic field or an inductive electric field, which represents that the design is made as a basic high frequency coupler.

It should be noted that the conductive layer 217 utilized as the second coupling electrode 218 in FIGS. 21A, 21B, and 21C can be configured utilizing a conductive region implemented on the printed board or a mechanism element, such as a chassis or a metal housing.

The present application contains subject matter related to that disclosed in Japanese Priority Patent Application JP 2009-164331 filed in the Japan Patent Office on Jul. 13, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A high frequency coupler, comprising:

a ground;

a first coupling electrode connected via a first resonator unit to an input and output terminal of a communication circuit; and one or more second coupling electrodes connected via a second resonator unit designed utilizing a ground to a ground terminal of the communication circuit.

2. The high frequency coupler according to claim 1, wherein, in a certain phase state of a high frequency signal flowing in the input and output terminal, charges with a sign different from that of charges concentrated in the first coupling electrode are concentrated in the second coupling electrode.

3. The high frequency coupler according to claim 1, wherein a ground for the first resonator unit is designed as the second resonator unit, and the second coupling electrode is placed at a site approximately symmetrical to the first coupling electrode.

4. The high frequency coupler according to claim 1, wherein the second coupling electrode is configured based on a shape of a ground plane.

5. The high frequency coupler according to claim 1, wherein at least one of the first and second coupling electrodes is configured based on a conductor pattern implemented on a printed board.

6. The high frequency coupler according to claim 1, wherein the second coupling electrode is configured using a chassis or a metal housing of a mobile instrument with the high frequency coupler built therein.

7. A communication device, comprising:

a communication circuit processing a communication signal;

a ground;

a first coupling electrode connected via a first resonator unit to an input and output terminal of the communication circuit; and one or more second coupling electrodes connected via a second resonator unit designed utilizing a ground to a ground terminal of the communication circuit; wherein the communication circuit processes the communication signal in accordance with a terminal voltage between the input and output terminal and the ground terminal.

* * * * *